(12) United States Patent
Nitzan et al.

(10) Patent No.: US 6,917,309 B2
(45) Date of Patent: Jul. 12, 2005

(54) FOREIGN OBJECT DETECTION SYSTEM AND METHOD

(75) Inventors: Alon Nitzan, Rosh-Ha'ayin (IL); Aviv Goner, Gan-Yavne (IL); Aviram Golan, Kfar-Saba (IL); Moshe Fisher, Petach-Tikva (IL)

(73) Assignee: Integritech System Engineering Ltd., Rosh-Ha'ayin (IL)

( * ) Notice: Subject to any disclaimer, the term of this patent is extended or adjusted under 35 U.S.C. 154(b) by 0 days.

(21) Appl. No.: 10/281,772

(22) Filed: Oct. 28, 2002

(65) Prior Publication Data

US 2004/0080433 A1 Apr. 29, 2004

(51) Int. Cl.$^7$ .............................................. G08B 21/00
(52) U.S. Cl. ........................ 340/945; 340/953; 340/972
(58) Field of Search ................................ 340/945, 947, 340/952, 953, 956, 972; 348/128–132, 216.1, 217.1; 382/103, 104

(56) References Cited

U.S. PATENT DOCUMENTS

| | | | | |
|---|---|---|---|---|
| 5,212,547 A | * | 5/1993 | Otsuki | 348/139 |
| 5,375,058 A | | 12/1994 | Bass | 364/439 |
| 5,629,691 A | | 5/1997 | Jain | 340/961 |
| 6,295,007 B1 | * | 9/2001 | O'Meara | 340/953 |
| 6,606,035 B2 | * | 8/2003 | Kapadia et al. | 340/972 |
| 2002/0080046 A1 | | 6/2002 | Derringer | 340/945 |
| 2002/0093433 A1 | | 7/2002 | Kapadia et al. | 340/945 |

* cited by examiner

*Primary Examiner*—Jeffery Hofsass
*Assistant Examiner*—Jennifer Stone
(74) *Attorney, Agent, or Firm*—Ladas and Parry LLP

(57) ABSTRACT

A system for detection of foreign objects on airport travel surfaces including a plurality of foreign object detector modules mounted on a corresponding plurality of existing aircraft travel surface lighting supports, the plurality of foreign object detector modules providing a corresponding plurality of detection outputs and a high speed detection output analyzer operative to receive at least one of the plurality of detection outputs and to provide a high speed output indication of foreign object presence.

59 Claims, 26 Drawing Sheets

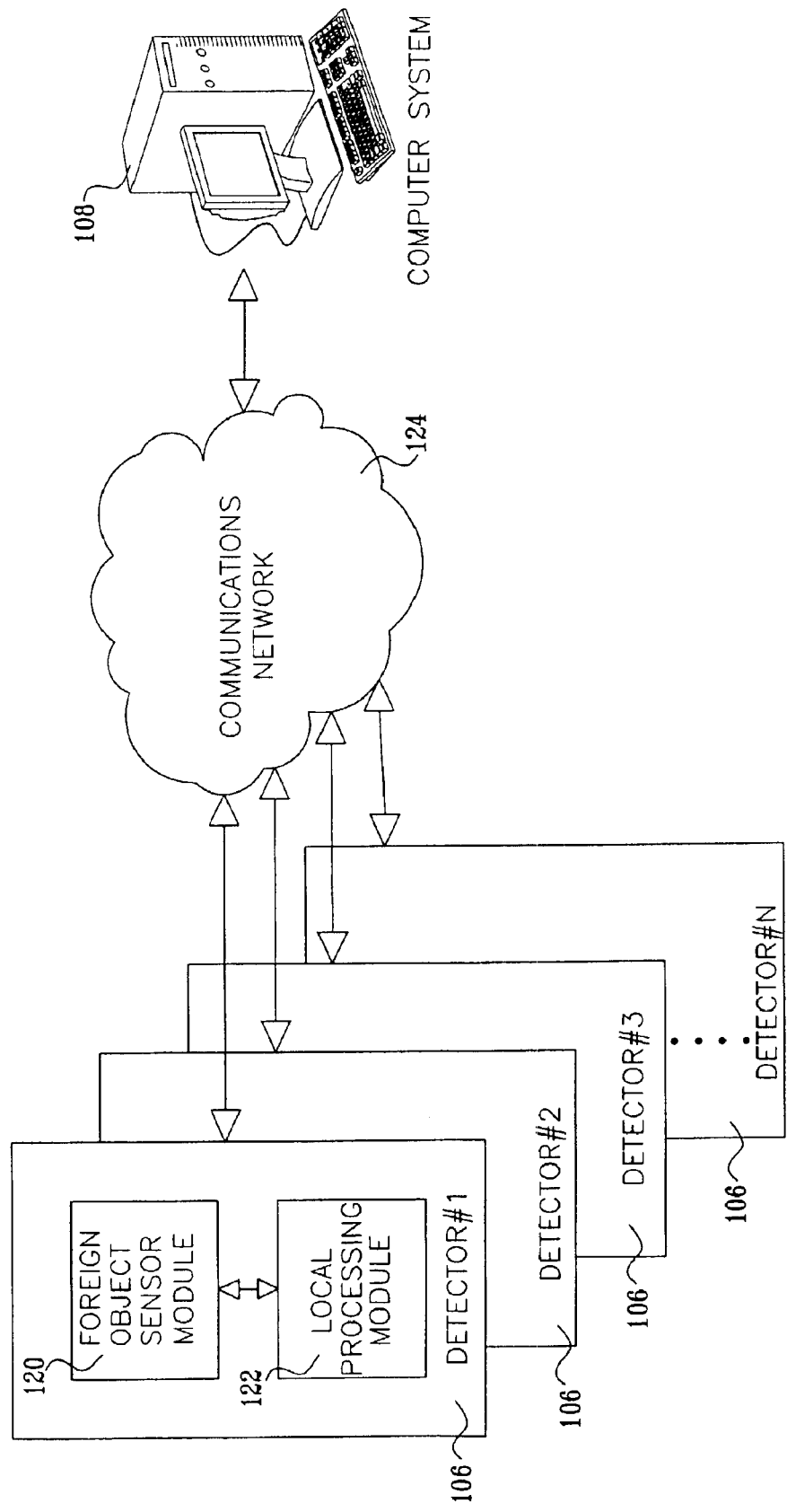

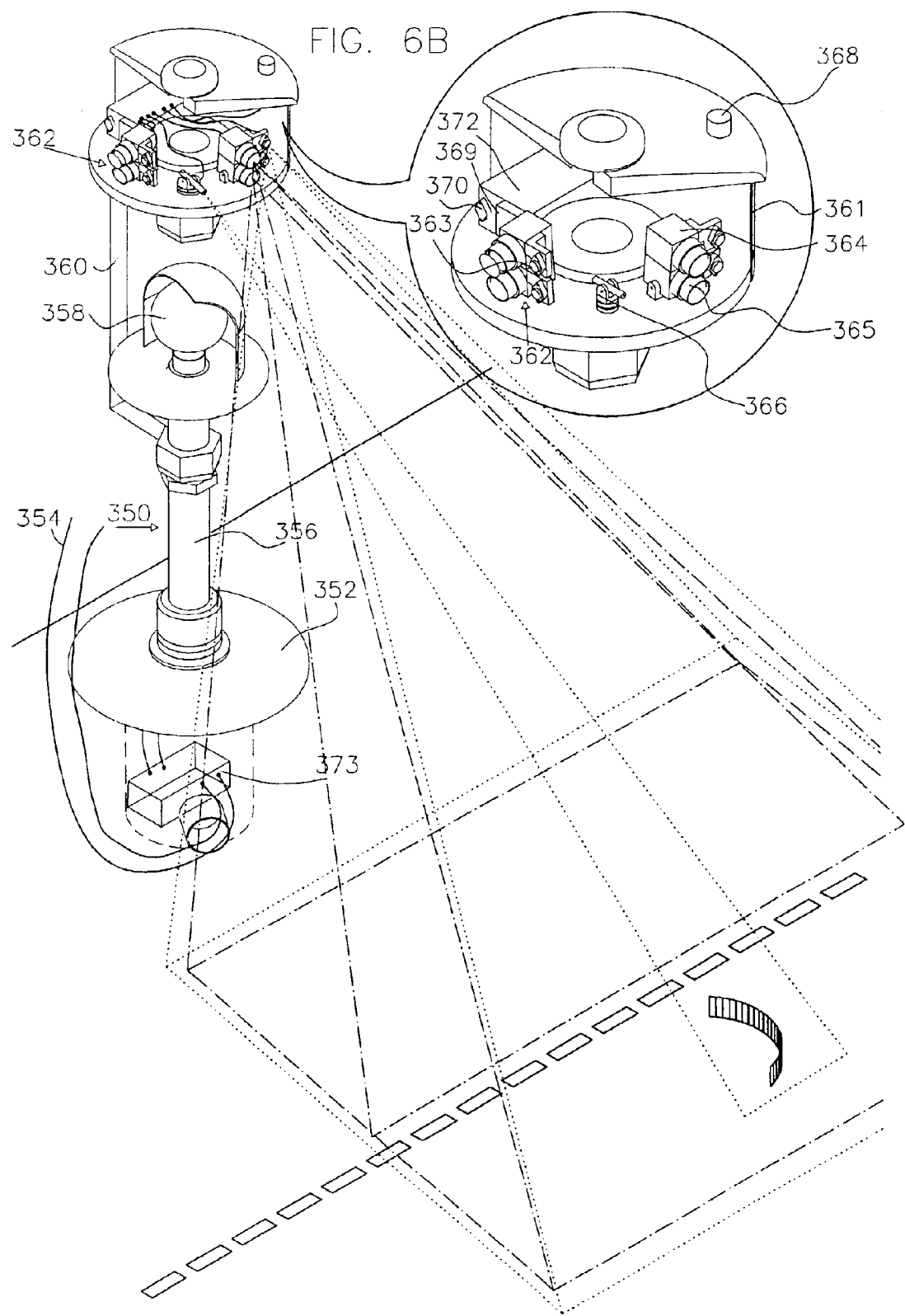

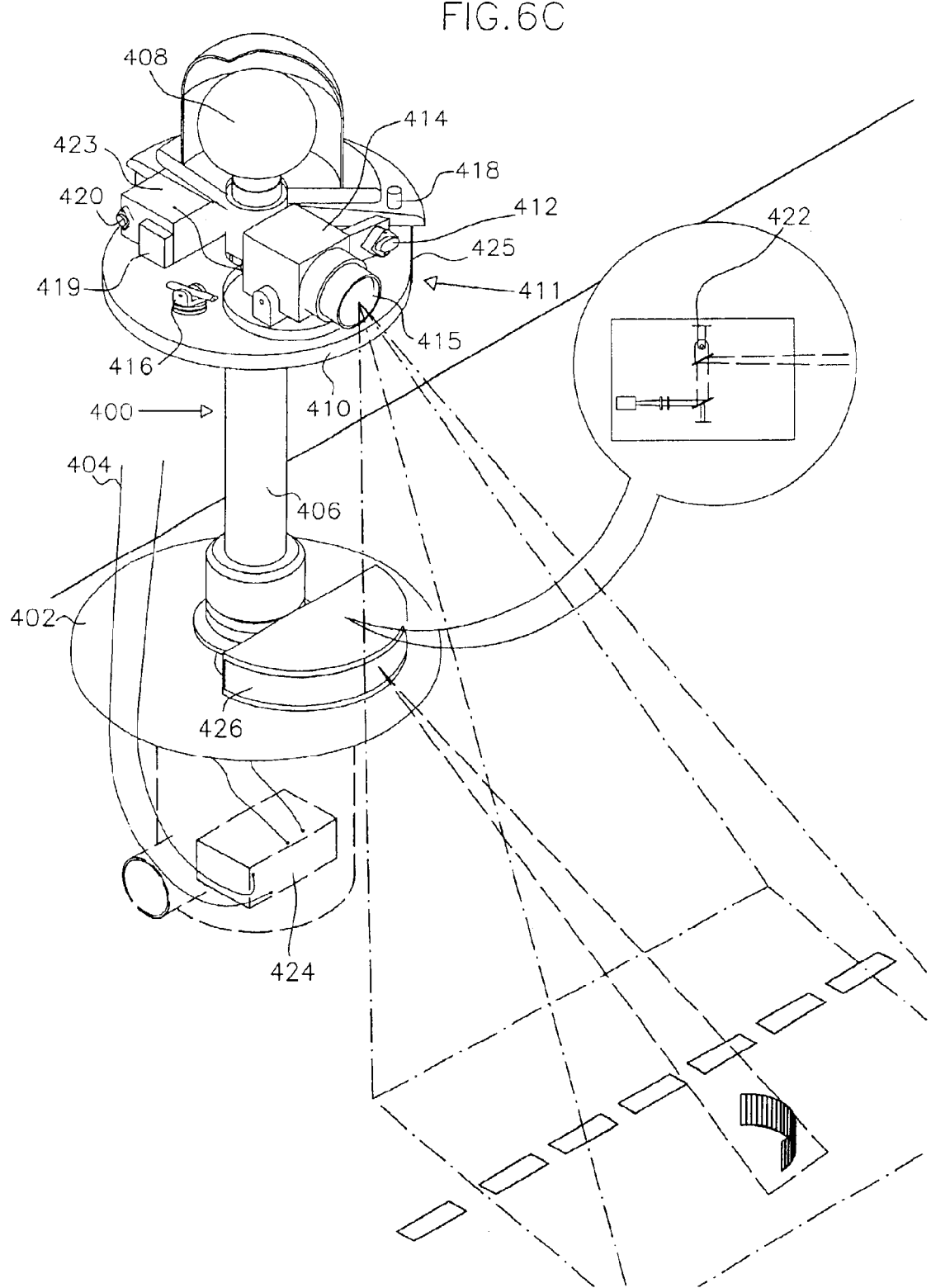

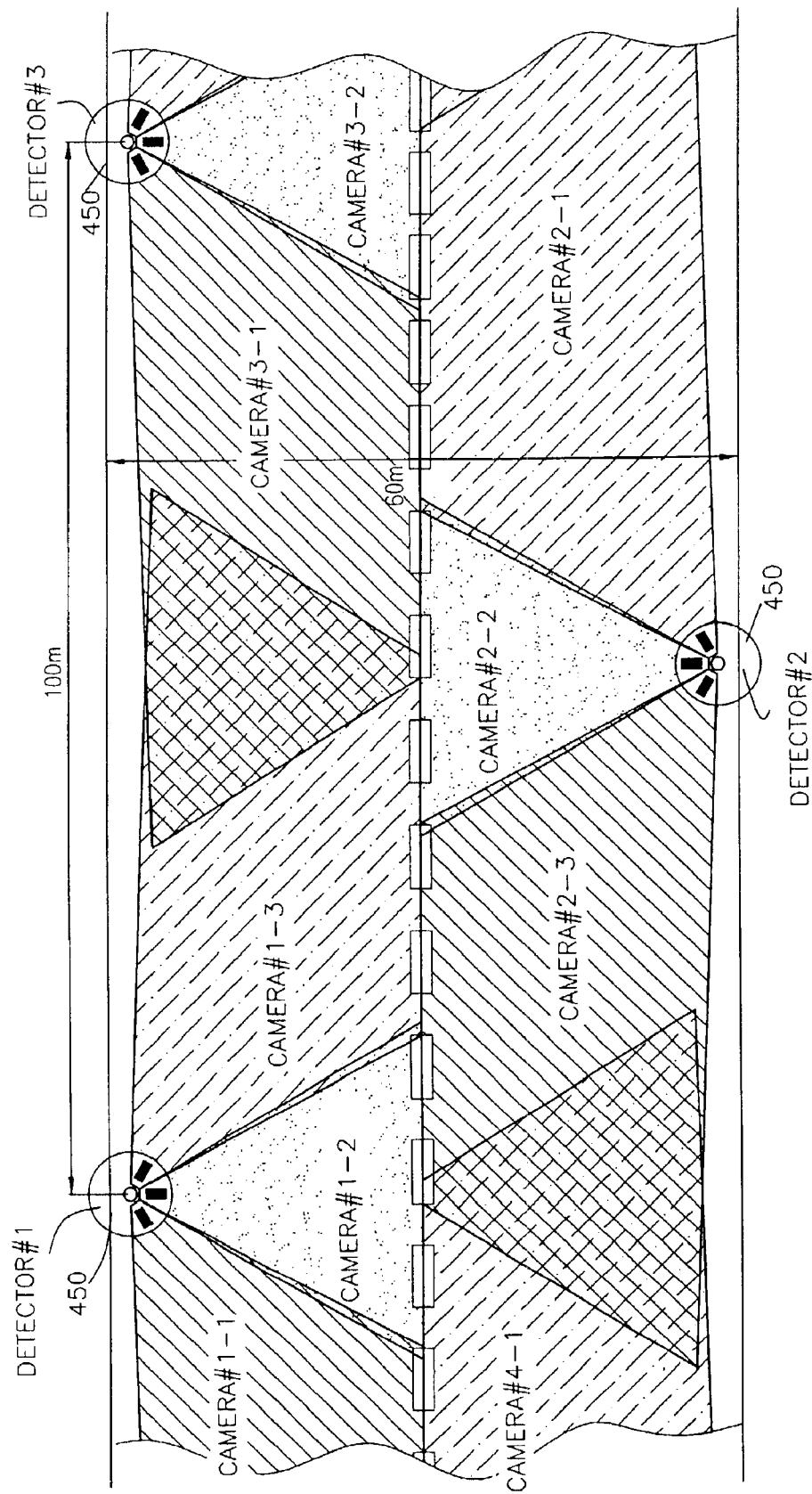

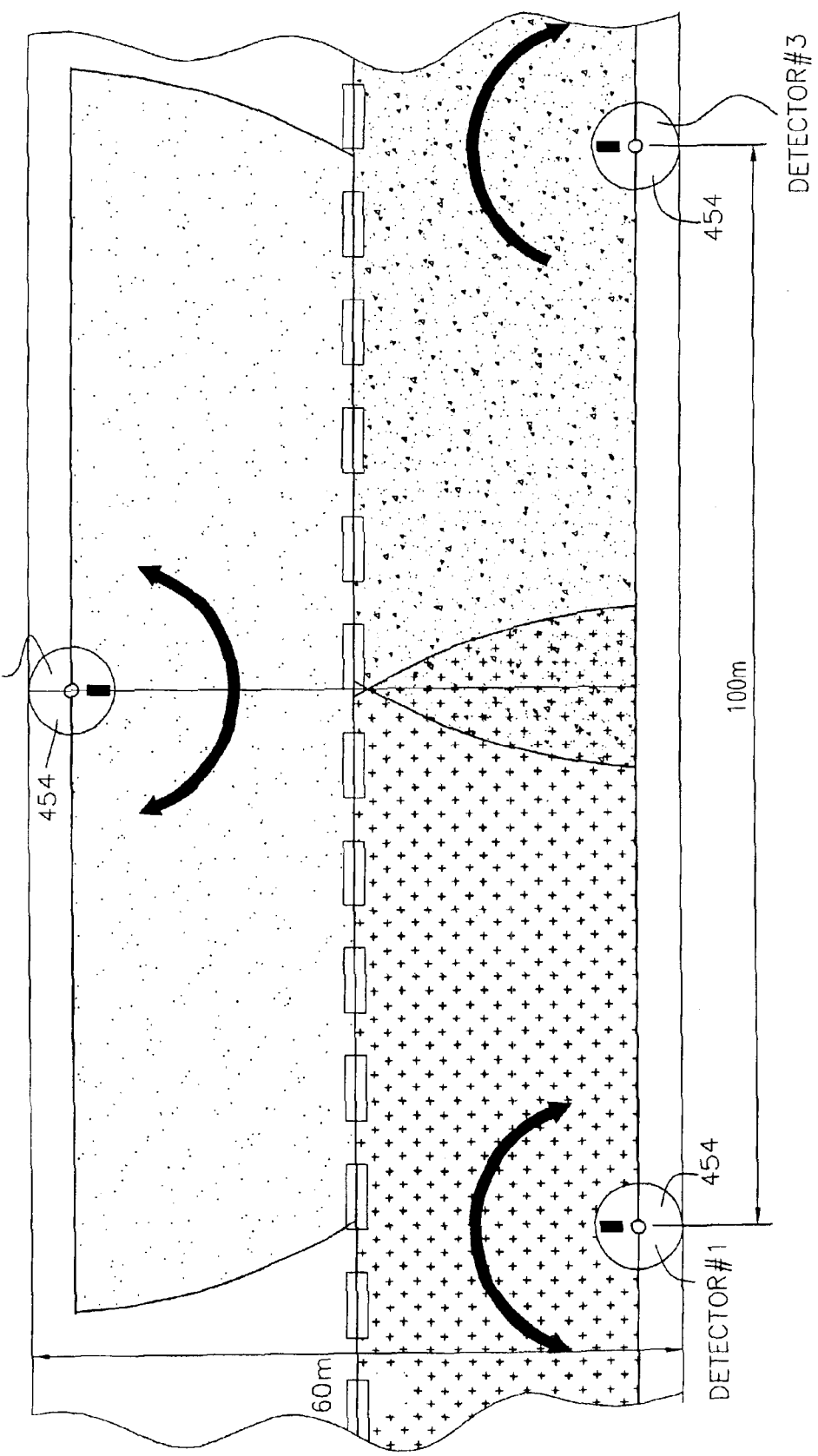

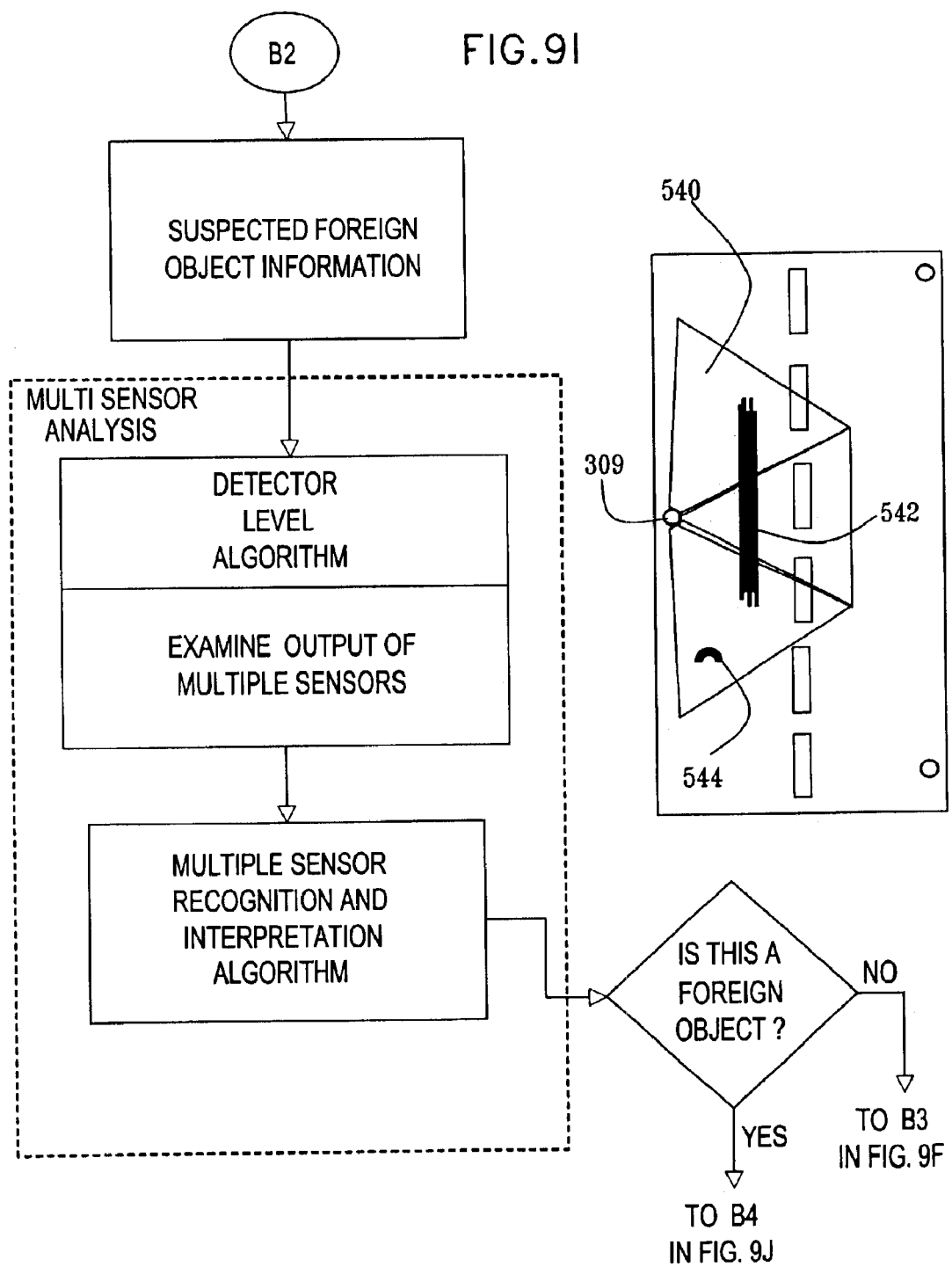

FOREIGN OBJECT DETECTION SYSTEM AND METHOD

FIELD OF THE INVENTION

The present invention relates to aircraft safety generally and more particularly to detection and warning of the presence of foreign objects on airport travel surfaces.

BACKGROUND OF THE INVENTION

There exist in the patent literature various proposals for detection and warning of the presence of foreign objects on airport travel surfaces. The following patent documents are believed to represent the current state of the art.

U.S. Published Patent Applications Nos. 2002/0080046A1; 2002/0109625 A1 and 2002/0093433 A1.

Additionally, U.S. Pat. No. 6,064,429 deals with the detection of foreign objects in a general sense.

SUMMARY OF THE INVENTION

The present invention seeks to provide a highly efficient and cost-effective system and methodology for detection and warning of the presence of foreign objects on airport travel surfaces There is thus provided in accordance with a preferred embodiment of the present invention a system for detection of foreign objects on airport travel surfaces including a plurality of foreign object detector modules mounted on a corresponding plurality of existing aircraft travel surface lighting supports, the plurality of foreign object detector modules providing a corresponding plurality of detection outputs and a high speed detection output analyzer operative to receive at least one of the plurality of detection outputs and to provide a high speed output indication of foreign object presence.

There is also provided in accordance with another preferred embodiment of the present invention a system for detection of foreign objects on airport travel surfaces including a plurality of foreign object detector modules located along aircraft travel surfaces and providing a corresponding plurality of detection outputs and a high speed detection output analyzer operative to receive the plurality of detection outputs and to provide a high speed output indication of foreign object presence within less than 1 minute.

There is further provided in accordance with yet another preferred embodiment of the present invention a method for detection of foreign objects on airport travel surfaces including mounting a plurality of foreign object detector modules on a corresponding plurality of existing aircraft travel surface lighting supports, operating the plurality of foreign object detector modules providing a corresponding plurality of detection outputs and analyzing the detection outputs at high speed to provide a high speed output indication of foreign object presence.

There is also provided in accordance with still another preferred embodiment of the present invention a method for detection of foreign objects on airport travel surfaces including locating a plurality of foreign object detector modules along airport travel surfaces, operating the plurality of foreign object detector modules providing a corresponding plurality of detection outputs and analyzing the detection outputs at high speed to provide a high speed output indication of foreign object presence within less than 1 minute.

Preferably, the airport travel surfaces include at least one taxiway and at least one runway and the system employs at least some existing electrical power infrastructure associated with existing runway and taxiway lighting fixtures.

Additionally, the plurality of foreign object detector modules communicate with a computer system which includes an operator console operative to provide a foreign object presence alarm and an image of the foreign object to an operator. Preferably, the high speed detection output analyzer is located in the vicinity of the operator console. Preferably, the system also includes a laser pointer associated with at least one of the plurality of foreign object detector modules to assist in on-site inspections.

In accordance with another preferred embodiment of the present invention each of the plurality of foreign object detector modules incorporates at least one foreign object sensor module and a local processing module which receives an output from the at least one foreign object sensor module and provides the detection output including at least an initial determination of whether a foreign object is present. Preferably, the local processing module includes multiple sensor correlation software providing correlation between the output from multiple ones of the at least one foreign object sensor module in the detector module.

Alternatively, each of the plurality of foreign object detector modules incorporates at least one foreign object sensor module which provides the detection output to the high speed detection output analyzer which is remotely located with respect thereto. Preferably, the high speed detection output analyzer includes multiple sensor correlation software providing correlation between the detection output from multiple ones of the at least one foreign object sensor module in individual ones of the plurality of detector modules. Additionally, the high speed detection output analyzer includes multiple detector correlation software providing correlation between the detection output from multiple ones of the at least one foreign object sensor module in multiple ones of the plurality of detector modules.

In accordance with yet another preferred embodiment, each of the plurality of foreign object detector modules includes at least one camera and at least one illuminator. Preferably, the at least one illuminator includes a fixed field illuminator. Additionally or alternatively, the at least one illuminator includes a scanning illuminator. In accordance with another preferred embodiment, the at least one camera includes a fixed field camera. Alternatively or additionally, the at least one camera includes a scanning camera. Preferably, the at least one camera includes a zoom functionality.

Additionally, each of the plurality of foreign object detector modules also has associated therewith at least one of a light level sensor, a vibration sensor and a temperature sensor.

In accordance with a preferred embodiment of the present invention, the system also includes controlling software which includes a communication module which handles communications with the plurality of detector modules via a communications network, and management software which interfaces with the communications module. Preferably, the management software interfaces with existing airport control systems, and with a database, a graphical user interface having image manipulation capability and an alarm indicator Additionally or alternatively, the management software also interfaces with multiple detector correlation software, which provides information based on outputs from multiple ones of the plurality of detector modules.

Preferably, the high speed detection output analyzer provides at least first and second modes of operation, the first mode of operation being employed under conditions of normal visibility and the second mode of operation being employed under conditions of impaired visibility. Additionally, the high speed detection output analyzer provides differing levels of signal/noise filtering for operation in the first and second modes of operation.

Additionally or alternatively, the high speed detection output analyzer software employs at least one of frame segmentation, gray level histogram comparison and edge detection. Preferably, the frame segmentation and gray level histogram comparison are employed to generate gray scale difference maps highlighting suspected foreign objects. Additionally, the edge detection is employed to generate edge extraction difference maps highlighting suspected foreign objects.

Preferably, the high speed detection output analyzer is operative to the high speed output indication of foreign object presence within less than 1 minute.

Preferably, the system also includes a storage unit, for storing the detection outputs in a time sequence. Additionally, the high speed detection output analyzer is operative to compare the detection outputs to the stored detection outputs.

Preferably, the plurality of foreign object detector modules have at least partially overlapping fields of view. Additionally or alternatively, the plurality of foreign object detector modules include a plurality of cameras, and the cameras have at least partially overlapping fields of view.

BRIEF DESCRIPTION OF THE DRAWINGS

The present invention will be understood more fully from the following detailed description, taken in conjunction with the drawings in which:

FIG. 2A is a simplified block diagram illustration of the system of FIG. 1 in accordance with one preferred embodiment of the present invention;

FIGS. 6A, 6B and 6C are simplified pictorial illustrations of three alternative sensor or sensor/processor modules mounted on existing lighting supports useful in the invention of FIGS. 1–5;

FIGS. 7A, 7B and 7C are simplified illustrations of the azimuthal extent of protected areas provided by an array of sensors of the types shown respectively in FIGS. 6A, 6B and 6C;

FIGS. 9A–9L are, together, a simplified flowchart illustrating the operation of a high speed detection output analyzer forming a portion of a system for detection of foreign objects on airport travel surfaces in accordance with a preferred embodiment of the present invention.

DETAILED DESCRIPTION OF PREFERRED EMBODIMENTS

Figure 1:
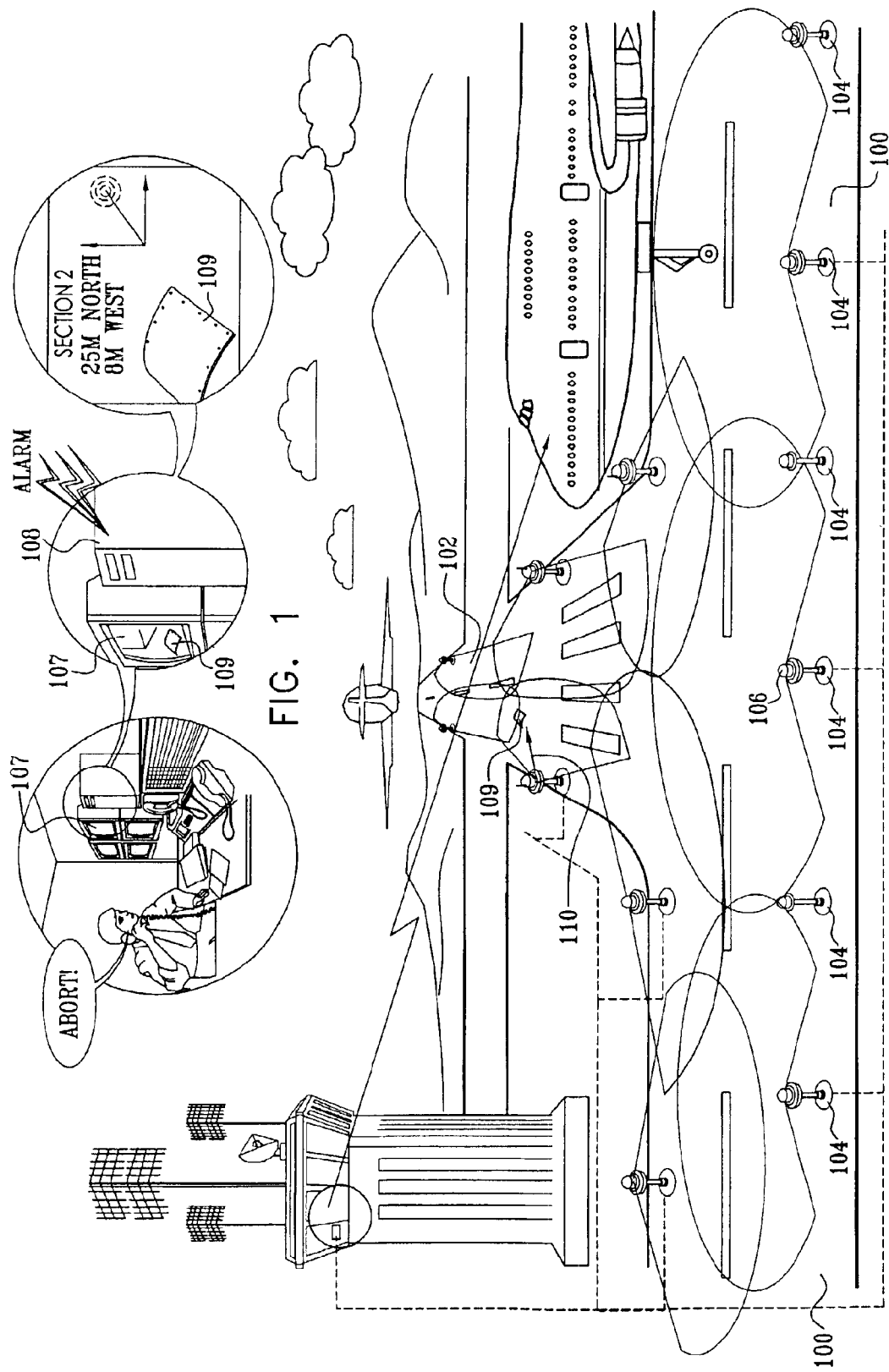
FIG. 1 is a simplified pictorial illustration of a system for detection of foreign objects on airport travel surfaces constructed and operative in accordance with a preferred embodiment of the present invention.

Reference is now made to FIG. 1, which is a simplified pictorial illustration of a system for detection of foreign objects on airport travel surfaces constructed and operative in accordance with a preferred embodiment of the present invention.

As seen in FIG. 1, the system is preferably incorporated into existing infrastructure of an airport having various airport travel surfaces, such as a taxiway 100 and a runway 102. The present invention may be applicable as well to other aircraft travel surfaces such as aprons (not shown).

Preferably, the system employs some or all of existing runway and taxiway lighting fixtures 104 and may employ electrical power supplies and conduits (not shown) associated therewith for both power and data communication. The system is also useful with individually solar powered lighting fixtures.

In the illustrated preferred embodiment of the present invention, some, but not all, of the existing lighting fixtures are equipped with foreign object detector modules 106 which enable detection of foreign objects on a runway or taxiway. Detector modules 106 preferably communicate, through a controlling software module described hereinbelow with reference to FIG. 5, with an operator console 107, which preferably forms part of a computer system 108, which may be any conventional network or standalone computer system. Operator console 107 preferably provides a foreign object presence alarm and an image of a detected foreign object 109 to an operator. The operator is thus enabled to make an abort decision as appropriate and is provided information relating to the location of the detected foreign object 109 in order to enable an oil-site inspection to be carried out quickly and efficiently.

A laser pointer 110 may be incorporated in the detector module 106 to assist in on-site inspections.

Reference is now made to FIG. 2A, which is a simplified block diagram illustration of the system of FIG. 1 in accordance with one preferred embodiment of the present invention. In the embodiment of FIG. 2A, each detector module 106 (FIG. 1) comprises a foreign object sensor module 120, comprising one or more sensors, such as cameras, and related devices as described hereinbelow with reference to FIGS. 6A–6C, and a local processing module 122 which receives at least one output from the sensor module 120 and provides at least an initial determination of whether a foreign object is present. Local processing module 122 preferably comprises a high speed detection output analyzer as described hereinbelow with reference to FIGS. 9A–9H and 9K–9L, and also preferably includes a multiple sensor correlation algorithm as described hereinbelow with reference to FIG. 9I. Each detector module 106 communicates, in a wired or wireless manner as most appropriate, via a communications network 124, such as a LAN, with the computer system 108 (FIG. 1).

Figure 2B:
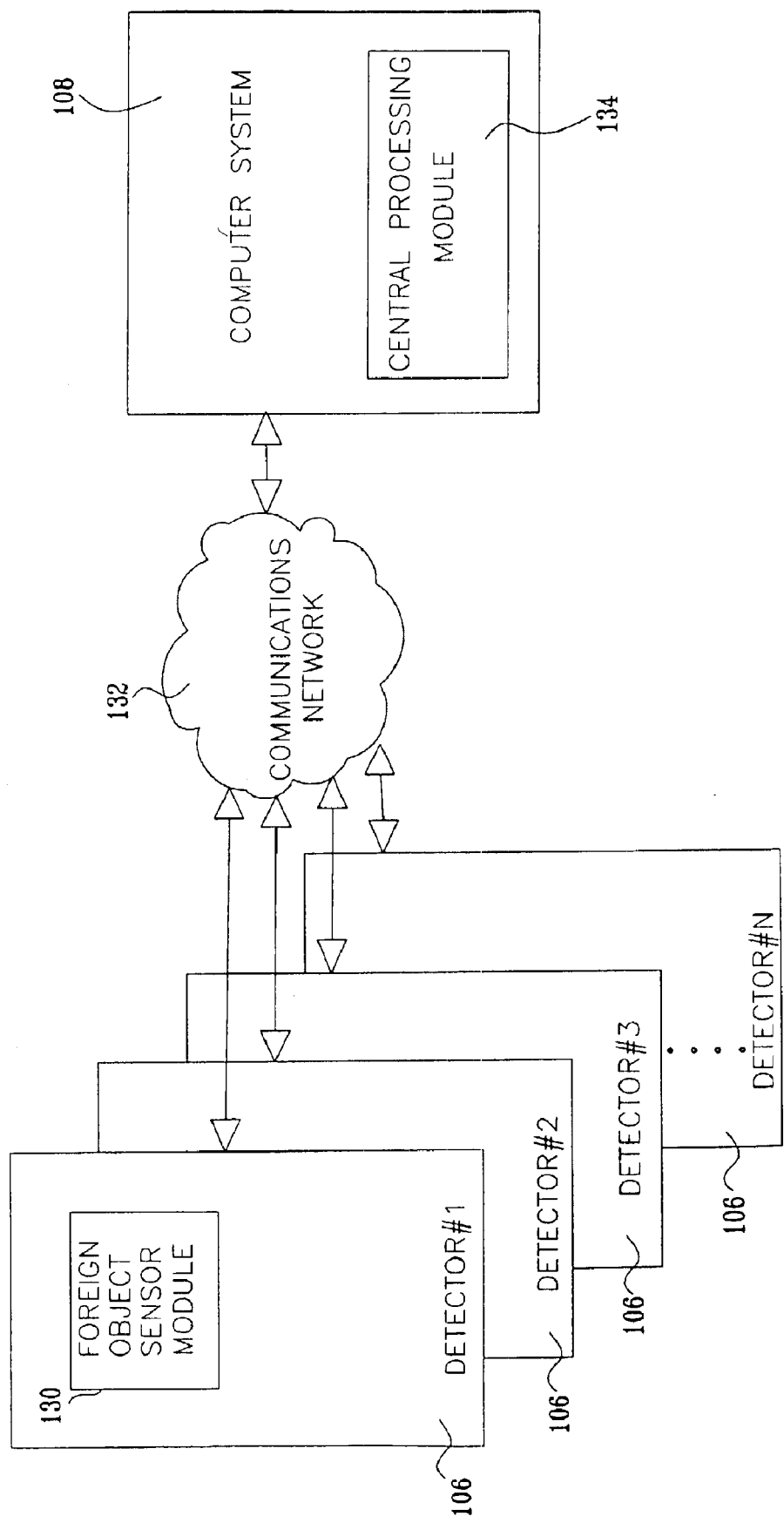
FIG. 2B is a simplified block diagram illustration of the system of FIG. 1 in accordance with another preferred embodiment of the present invention.

Reference is now made to FIG. 2B, which is a simplified block diagram illustration of the system of FIG. 1 in accordance with another preferred embodiment of the present invention. In the embodiment of FIG. 2B, each detector module 106 (FIG. 1) comprises a foreign object sensor module 130, comprising one or more sensors, such as cameras, and related devices as described hereinbelow with reference to FIGS. 6A–6C. Each detector module 106 communicates, in a wired or wireless manner as most appropriate, via a communications network 132, such as a LAN, with the computer system 108 (FIG. 1), which includes a central processing module 134, which provides at least an initial determination of whether a foreign object is present. Central processing module 134 preferably comprises a high speed detection output analyzer as described hereinbelow with reference to FIGS. 9A–9H and FIGS. 9K–9L, which preferably also includes a multiple sensor correlation algorithm as described hereinbelow with reference to FIG. 9I and a multiple detector correlation algorithm as described hereinbelow with reference to FIG. 9J.

Figure 3:
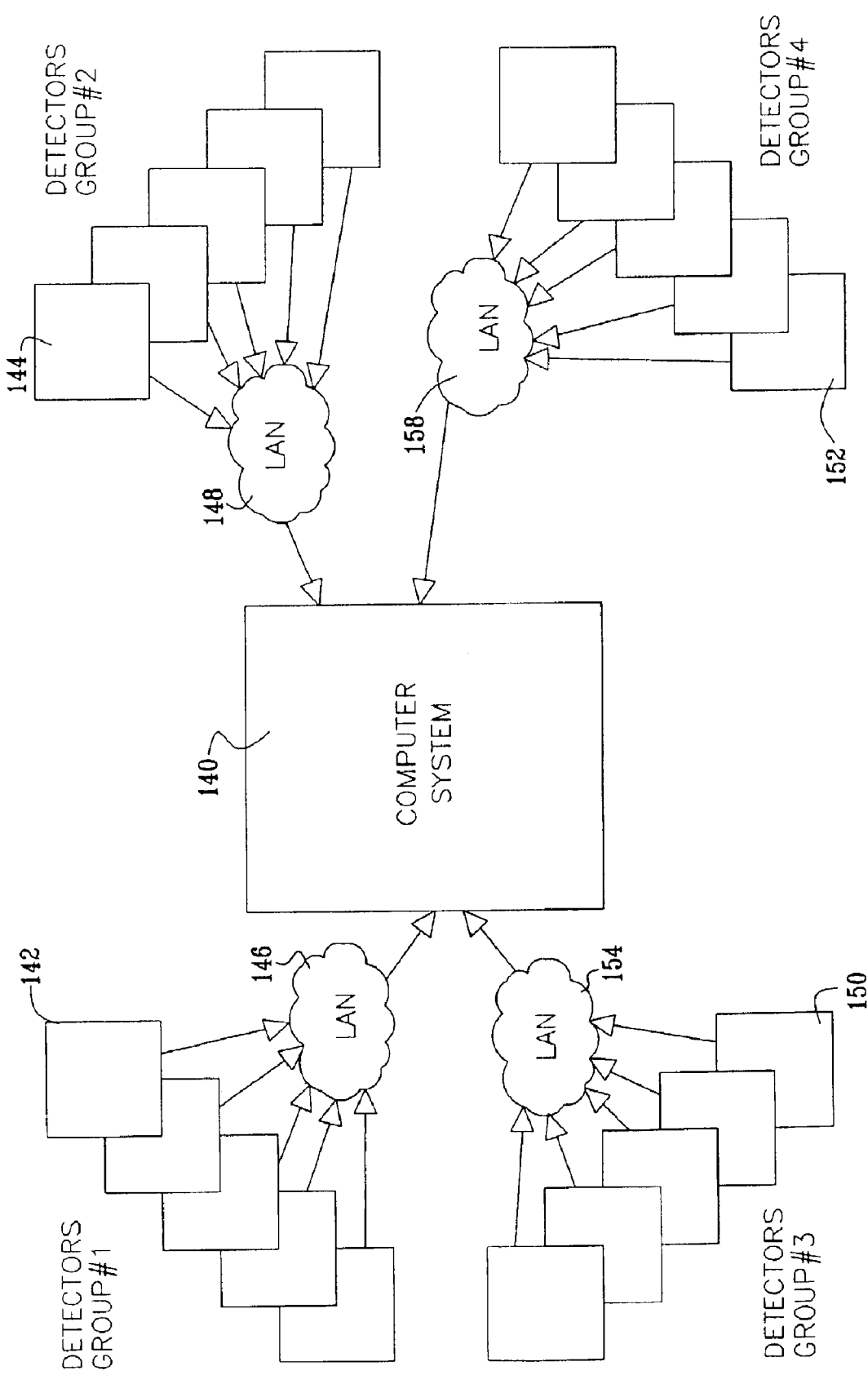
FIG. 3 is a simplified block diagram illustration of a combined system of the type shown in FIG. 1, which incorporates elements of at least one of the types shown in FIGS. 2A and 2B.

Reference is now made to FIG. 3, which is a simplified block diagram illustration of a combined system of the type shown in FIG. 1, which incorporates elements of at least one of the types shown in FIGS. 2A and 2B. As seen in FIG. 3, multiple groups of detector modules 106 (FIG. 1) may communicate via multiple computer networks, through management software described hereinbelow with reference to FIG. 5, with a computer system 140, such as computer system 108 of FIG. 1. For example, first and second groups 142 and 144 of detector modules 106 (FIG. 1), of the type shown in FIG. 2A, may communicate via respective LANs 146 and 148, while third and fourth groups 150 and 152 of detector modules 106 (FIG. 1), of the type shown in FIG. 2B may communicate via respective LANs 154 and 158, with computer system 140.

Figure 4A:
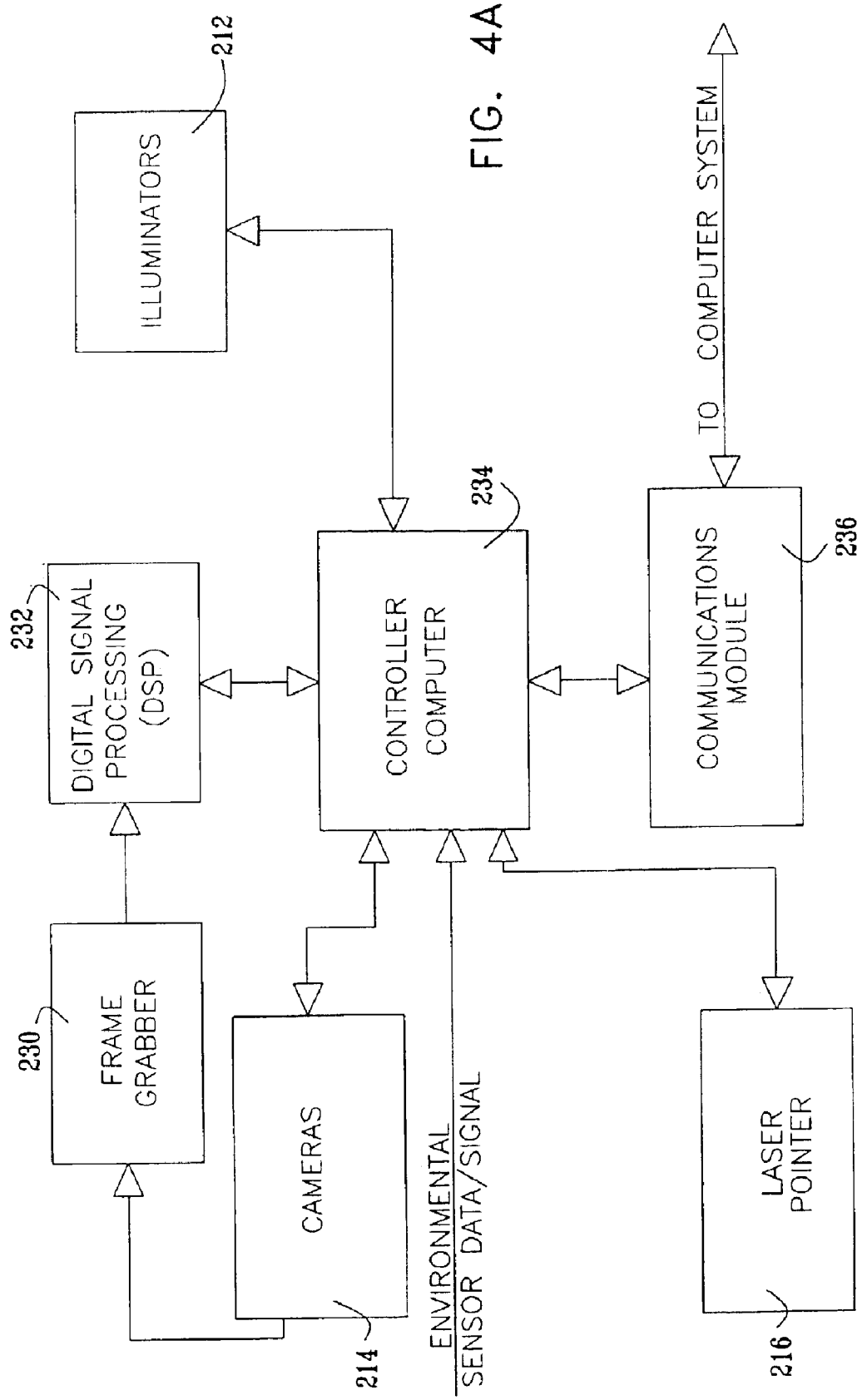
FIG. 4A is a simplified block diagram illustration of a detector module forming part of the system of FIG. 2A.

Reference is now made to FIG. 4A, which is a simplified block diagram illustration of a detector module forming part of the system of FIG. 2A. As seen in FIG. 4A, an output signal from camera 214 is preferably received by a frame grabber 230 which outputs to digital signal processing circuitry 232, which performs image analysis on the output of camera 214. Digital signal processing circuitry 232 preferably comprises a high speed detection output analyzer as described hereinbelow with reference to FIGS. 9A–9H and 9K–9L, which also preferably includes a multiple sensor correlation algorithm as described hereinbelow with reference to FIG. 9I.

Figure 6A:
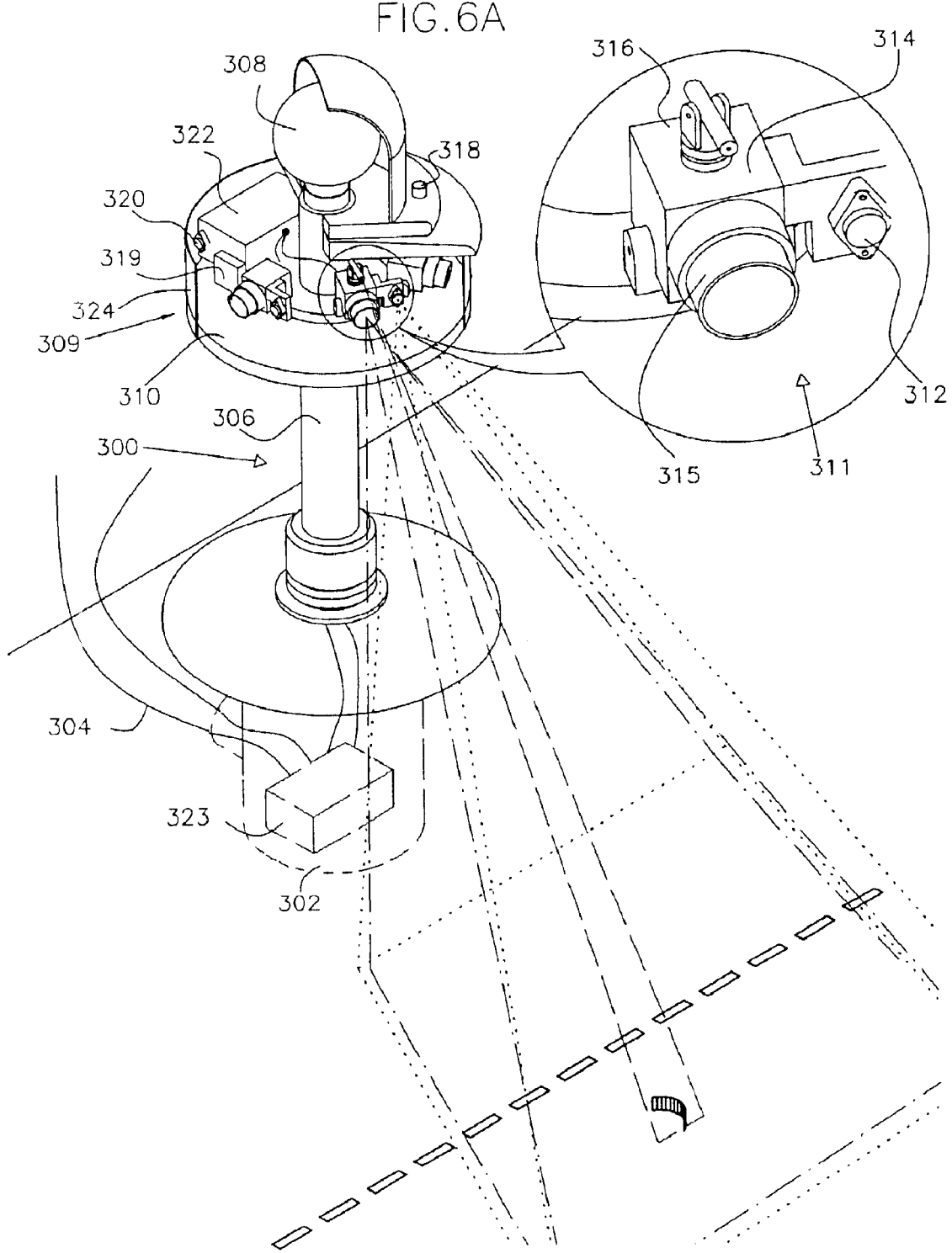

A controller computer 234 receives an output from digital signal processing circuitry 232 and may also receive an output from one or more environmental sensors such as sensors 318, 319 and 320 (FIG. 6A). Controller computer 234 also provides control outputs to illuminators 212, cameras 214, laser pointers 216 and other elements described hereinabove with reference to FIG. 4A.

A communications module 236 interfaces with controller computer 234 and provides data communications via communications network 124 (FIG. 2A), such as a LAN, with computer system 108 (FIG. 1). It is appreciated that the communications may be wired and/or wireless and may employ the existing wiring connection 304 to lamp 308 (FIG. 6A).

Figure 4B:
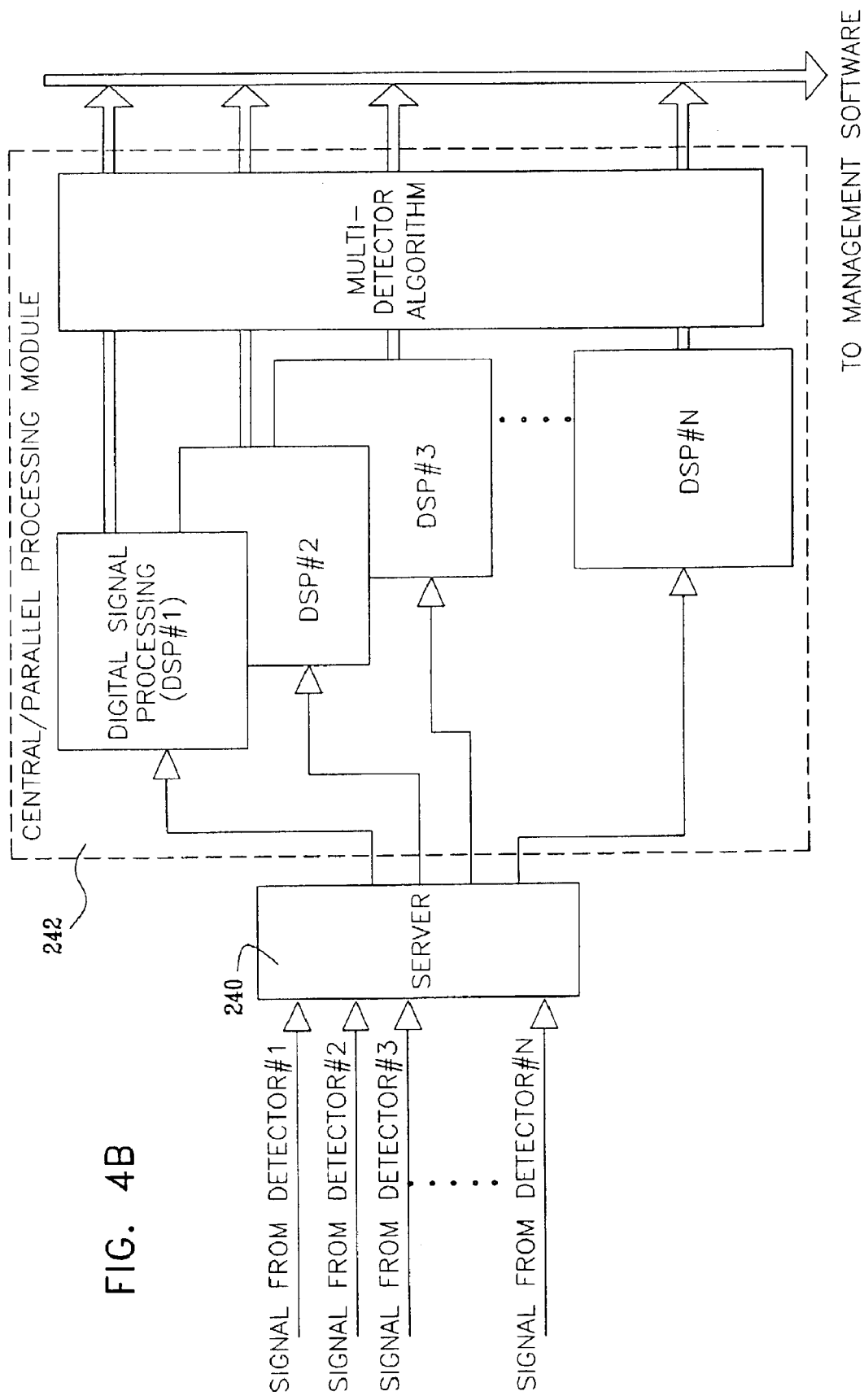
FIG. 4B is a simplified block diagram illustration of a central processor module forming part of the system of FIG. 2B.

Reference is now made to FIG. 4B, which is a simplified block diagram illustration of a central processing module forming part of the system of FIG. 2B. As seen in FIG. 4B, the central processing module preferably comprises a server 240 which receives via communications network 132 (FIG. 2B), such as a LAN, output signals from a plurality of foreign object detector modules 106 (FIG. 2B) which include sensor modules 130 (FIG. 2B) and preferably provides them to a central processing module 242, which preferably comprises parallel processors with the capacity to process all of the output signals in real time. Central processing module 242 preferably comprises a high speed detection output analyzer as described hereinbelow with reference to FIGS. 9A–9H and 9K–9L, which preferably also includes a multiple sensor correlation algorithm as described hereinbelow with reference to FIG. 9I and a multiple detector correlation algorithm as described hereinbelow with reference to FIG. 9J. Central processing module 942 preferably communicates, through management software described hereinbelow with reference to FIG. 5, with operator console 107 (FIG. 1) to provide an indication of whether a foreign object is present.

Figure 5:
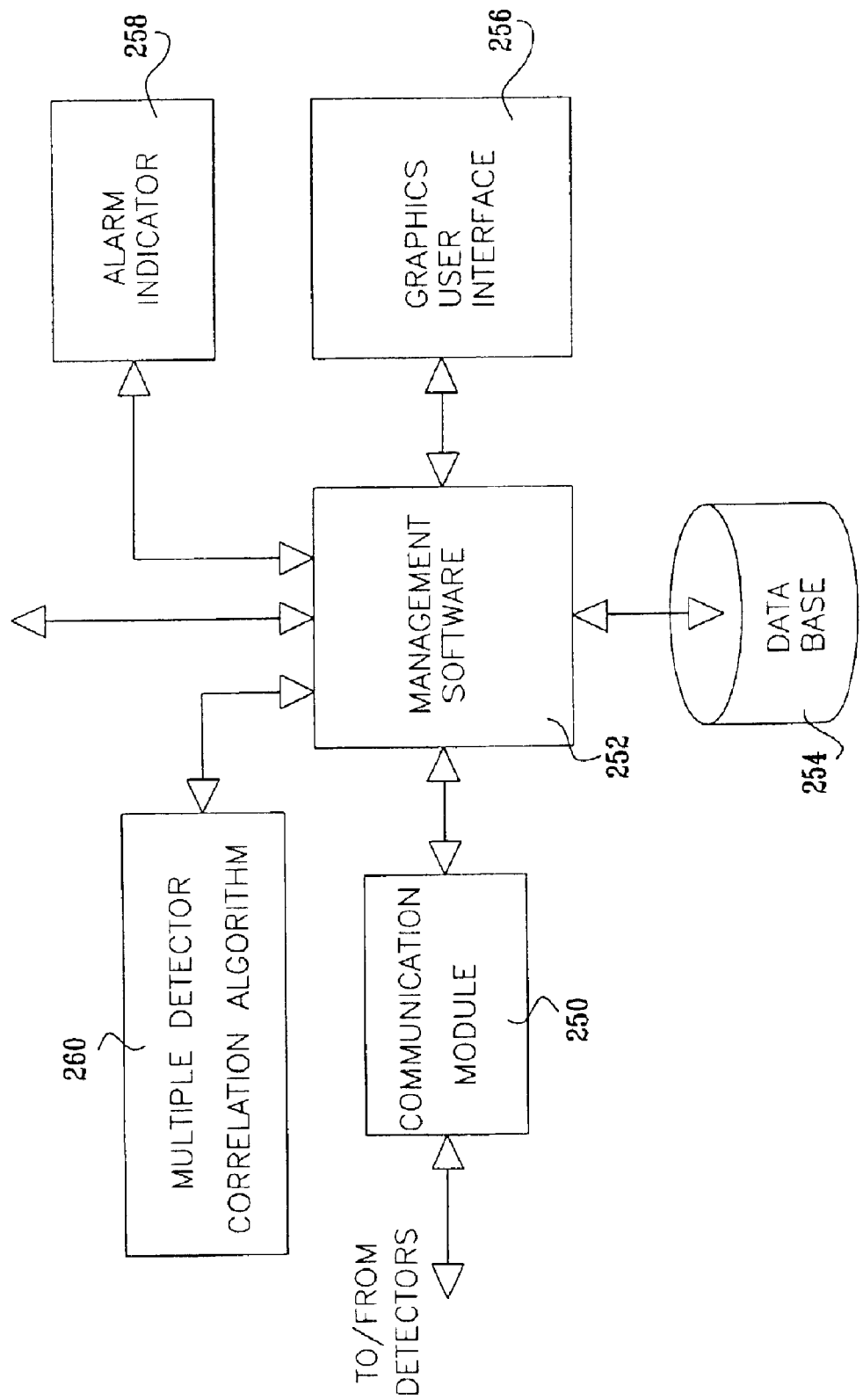
FIG. 5 is a simplified block diagram illustration of a controlling software module, forming part of the computer system in accordance with the embodiment of FIG. 2A.

Reference is now made to FIG. 5, which is a simplified block diagram illustration of a controlling software module forming part of the computer system in accordance with the embodiment of FIG. 2A. The controlling software module is preferably installed in computer system 108 (FIG. 1) and comprises a communication module 250 which handles the communications with the plurality of detector modules 106 (FIG. 2A) via communications network 124 (FIG. 2A). Communication module 250 interfaces with management software 252 which, in turn, interfaces with a database 254, with a graphical user interface 256 having image manipulation capability provided by software, such as ADOBE® PHOTOSHOP®, and with an alarm indicator 258. Additionally, communication module 250 or management software 252 may interface with existing airport control systems. The management software 252 may also interface with a multiple detector correlation algorithm 260, a preferred embodiment of which is described in reference to FIG. 9J hereinbelow, which correlates outputs received from multiple detector modules 106 (FIG. 2A).

It is appreciated that a controlling software module similar to the controlling software module of FIG. 5 may form part of the embodiment described in reference to FIGS. 2B and 4B. In such a case, the management software 252 communicates via the communication module 250 with the central processing module 242 of FIG. 4B and does not interface with multiple detector correlation algorithm 260, since this functionality is incorporated into central processing module 242.

Reference is now made to FIGS. 6A, 6B and 6C, which are simplified pictorial illustrations of three alternative sensor or sensor/processor modules mounted on existing lighting supports useful in the invention of FIGS. 1–5.

Specific reference is now made to FIG. 6A, which is a simplified pictorial illustration of a preferred embodiment of a detector module forming part of the system of FIG. 2A. As seen in FIG. 6A, an existing airport lighting assembly 300, including a base 302 having an underground electrical wiring connection 304, a support shaft 306 and a lamp 308 may provide a platform for the detector module 309. Preferably a support surface 310 is mounted onto shaft 306 below lamp 308. Mounted onto support surface 310 there are preferably provided a plurality of static imaging assemblies 311, each preferably comprising an illuminator 312 and a camera 314. Camera 314 is preferably equipped with optics 315 including, inter alia, a near IR filter which is employed during daylight operation when illuminator 312 is not employed.

One or more of the static imaging assemblies 311 may also comprise a selectably directable laser pointer 316 for indicating the location of a suspected foreign object. Alternatively, one or more scanning imaging assemblies may be employed instead of static imaging assemblies.

One or more environmental sensors, such as a light level sensor 318, a vibration sensor 319 and a temperature sensor 320, may also be mounted on support surface 310.

Preferably illuminators 312, cameras 314 and environmental sensors, such as sensors 318, 319 and 320, are electrically connected to a local processor and communication module 322 which provides electrical power for operation and preferably also provides two-way data communication for controlling the operation of the illuminators 312, cameras 314, optics 315 and laser pointers 316 as well as processing image data from cameras 314, including performing initial image analysis thereon and providing foreign object detection output signals and environmental sensor signals via communications network 124 (FIG. 2A), such as a LAN, to computer system 108 (FIG. 1).

Preferably, electrical power supplied to lamp 308 via wiring 304 is employed to power the detector module and the various elements described hereinabove. Preferably a rechargeable battery 323 is provided to store electrical power during times that lamp 308 is illuminated and to enable such stored electrical power to be used during all other times for powering the detector module and the various elements described hereinabove.

Preferably, the static imaging assemblies 311 are enclosed within a suitable environmental enclosure 324 which includes portions that are transparent to light as required by the illuminators 312, cameras 314 and laser pointers 316.

It is appreciated that the detector module of FIG. 6A may also be useful in the embodiment of FIG. 2B. In such a case, the local processor and communication module 322 does not provide local image processing.

It is appreciated that any suitable number of cameras 314, illuminators 312 and laser pointers 316 may be included in a detector module. It is also appreciated that the base 302 having underground electrical wiring connection 304, may be replaced by an above-ground support and wiring connection.

Figure 7B:
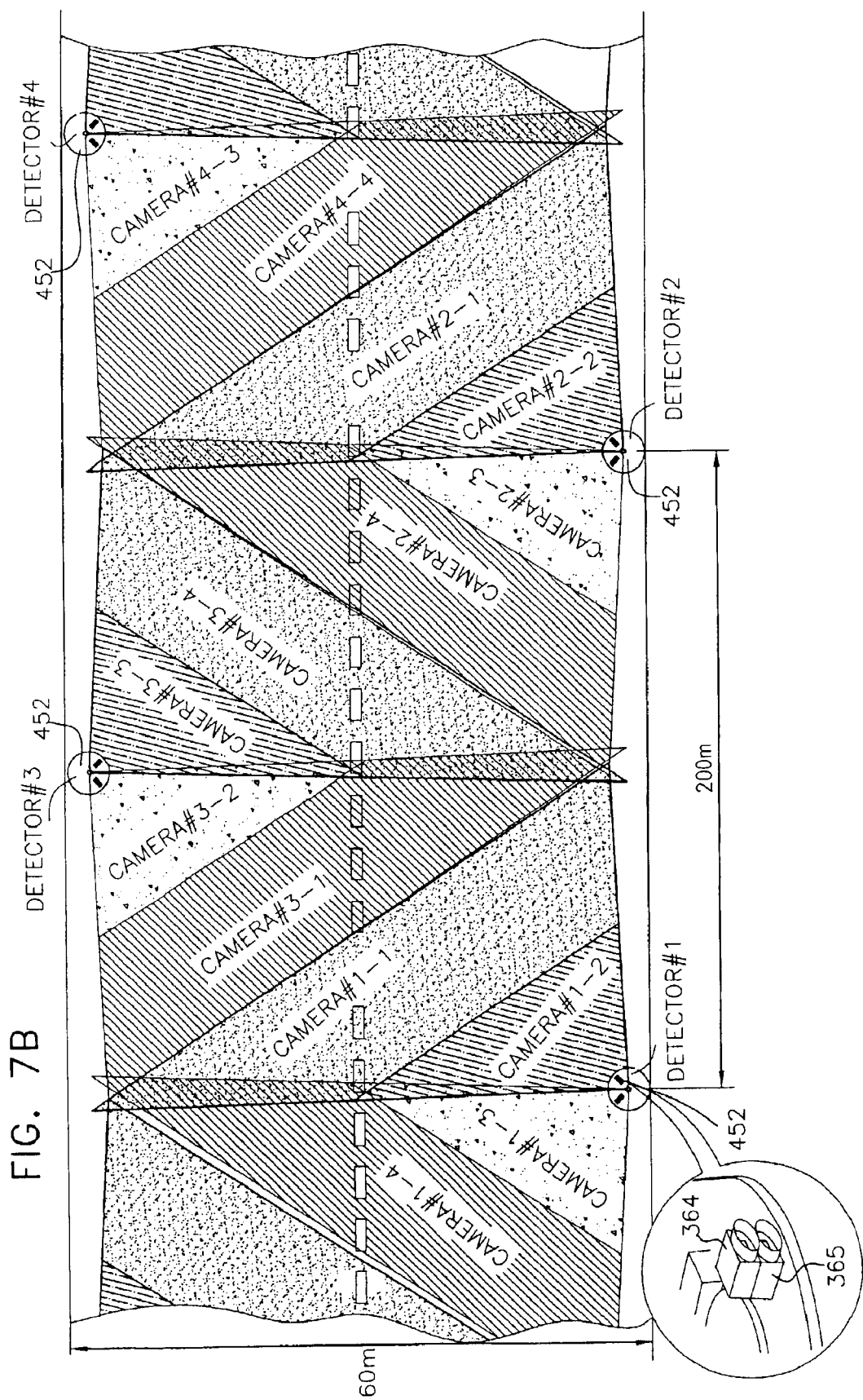

Specific reference is now made to FIG. 6B, which is a simplified pictorial illustration of a preferred embodiment of a detector module forming part of the system of FIG. 2A. As seen in FIG. 6B, an existing airport lighting assembly 350, including a base 352 having an under-ground electrical wiring connection 354, a support shaft 356 and a lamp 358 may provide a platform for the detector module. Preferably a support bracket 360 is mounted onto shaft 356 below lamp 358. Mounted onto support bracket 360 there is preferably provided an enclosure 361, which may be similar to enclosure 324 of FIG. 6A, and preferably encloses a plurality of static imaging assemblies 362, each preferably comprising at least one illuminator 363 and a pair of cameras 364 and 365, preferably arranged in stacked relationship. This stacked relationship provides different elevations for cameras 364 and 365, providing complementary fields of view as shown in FIGS. 7B and 8B and described hereinbelow in reference thereto. Alternatively, cameras 364 and 365 may be arranged side by side, having different elevational tilts to provide these complementary fields of view. Cameras 364 and 365 are preferably equipped with optics (not shown) including, inter alia, a near IR filter which is employed during daylight operation when illuminator 363 is not employed.

Disposed within enclosure 361 there is preferably provided a selectably directable laser pointer 366 for indicating the location of a suspect foreign object. Alternatively, one or more scanning imaging assemblies may be employed instead of static imaging assemblies.

One or more environmental sensors, such as a light level sensor 368, a vibration sensor 369 and a temperature sensor 370, may also be mounted on support bracket 360.

Preferably illuminators 363, cameras 364 & 365 and environmental sensors, such as sensors 368, 369 and 370, are electrically connected to a local processor and communication module 372 which provides electrical power for operation and preferably also provides two-way data communication for controlling the operation of the illuminators 363, cameras 364 & 365 and laser pointers 366 as well as processing image data from cameras 364 & 365, including performing initial image analysis thereon and providing foreign object detection output signals and environmental sensor signals via communications network 124 (FIG. 2A), such as a LAN, to computer system 108 (FIG. 1).

Preferably, electrical power supplied to lamp 358 via wiring 354 is employed to power the detector module and the various elements described hereinabove. Preferably, a rechargeable battery 373 is provided to store electrical power during times that lamp 358 is illuminated and to enable such stored electrical power to be used during all other times for powering the detector module and the various elements described hereinabove.

It is appreciated that the detector module of FIG. 6B may also be useful in the embodiment of FIG. 2B. In such a case, the local processor and communication module 372 does not provide local image processing.

It is appreciated that any suitable number of cameras 364 & 365, illuminators 362 and laser pointers 366 may be included in a detector module. It is also appreciated that the base 352 having underground electrical wiring connection 354, may be replaced by an above-ground support and wiring connection.

Specific reference is now made to FIG. 6C, which is a simplified pictorial illustration of a preferred embodiment of a detector module forming part of the system of FIG. 2A. As seen in FIG. 6C, an existing airport lighting assembly 400, including a base 402 having an underground electrical wiring connection 404, a support shaft 406 and a lamp 408 may provide a platform for the detector module. Preferably a support surface 410 is mounted onto shaft 406 below lamp 408. Mounted onto support surface 410 there are preferably provided one or more scanning imaging assemblies 411, each preferably comprising an illuminator 412 and a scanning camera 414. Camera 414 is preferably equipped with optics 415 including, inter alia, a near IR filter which is employed during daylight operation when illuminator 412 is not employed.

Mounted onto support surface 410 there is preferably provided one or more selectably directable laser pointers 416 for indicating the location of a suspect foreign object. Alternatively, the laser pointer 416 may be included in one or more of the scanning imaging assemblies 411.

One or more environmental sensors, such as a light level sensor 418, a vibration sensor 419 and a temperature sensor 420, may also be mounted on support surface 410.

In accordance with a preferred embodiment of the present invention, a scanning illuminator 422 is mounted adjacent the base 402 to direct illumination parallel to and just above an aircraft travel surface, typically up to 2–3 cm above the surface. This illumination is designed to illuminate foreign objects on the aircraft travel surface without generally illuminating the travel surface itself, thus greatly increasing contrast.

Preferably illuminators 412 & 422, cameras 414 and environmental sensors, such as sensors 418, 419 and 420, are electrically connected to a local processor and communication module 423 which provides electrical power for operation and preferably also provides two-way data communication for controlling the operation of the illuminators 412 & 422, cameras 414 and laser pointers 416 as well as processing image data from cameras 414, including performing initial image analysis thereon and providing foreign object detection output signals and environmental sensor signals via communications network 124 (FIG. 2A), such as a LAN, to computer system 108 (FIG. 1).

Preferably, electrical power supplied to lamp 408 via wiring 404 is employed to power the detector module and the various elements described hereinabove. Preferably, a rechargeable battery 424 is provided to store electrical power during times that lamp 408 is illuminated and to enable such stored electrical power to be used during all other times for powering the detector module and the various elements described hereinabove.

Preferably, the scanning imaging assemblies 411 are enclosed within a suitable environmental enclosure 425 and the scanning illuminator 422 is enclosed within a suitable environmental enclosure 426. Enclosures 425 and 426 include portions that are transparent to light as required by the illuminators 412 & 422, cameras 414 and laser pointers 416.

Preferably at least one scanning imaging assembly 411 is provided with zoom capabilities for enhancing resolution.

It is appreciated that the detector module of FIG. 6C may also be useful in the embodiment of FIG. 2B. In such a case, the local processor and communication module 423 does not provide local image processing.

It is appreciated that any suitable number of cameras 414, illuminators 412 & 422 and laser pointers 416 may be included in a detector module. It is also appreciated that the base 402 having underground electrical wiring connection 404, may be replaced by an above-ground support and wiring connection.

Reference is now made to FIGS. 7A, 7B and 7C, which are simplified illustrations of the azimuthal extent of protected areas provided by an array of sensors of the types shown respectively in FIGS. 6A, 6B and 6C. FIGS. 7A–7C illustrate an example of use of the invention on a runway having a width of 60 meters, where detector modules are deployed on both sides of the runway every 100 meters in FIGS. 7A and 7C, and every 200 meters in FIG. 7B. It is assumed that the runway surface is inclined downwardly towards its side edges for drainage purposes.

Turning to FIG. 7A, it is seen that each detector module 309 of FIG. 6A, designated here by reference numeral 450 and having three static imaging assemblies 311 (FIG. 6A) typically at an elevation of 50 cm above the runway, provides slightly less than 180 degree overall coverage of one side of the runway, each imaging assembly 311 providing 60 degree coverage which slightly overlaps with that provided by an adjacent imaging assembly 311. In the illustrated example, each of detectors 1, 2 and 3 comprise three cameras, where the fields of view of the three cameras of detector 1 are designated as camera #1-1, camera #1-2 and camera #1-3. Similar designations are used for the cameras of detectors 2 and 3, as well as the field of view of one of the cameras of detector 4 (not shown), which is designated camera #4-1.

Turning, to FIG. 7B, it is seen that each detector module of FIG. 6B, designated here by reference numeral 452 and having two static imaging assemblies 362 (FIG. 6B), each including first and second mutually stacked cameras 364 & 365, typically at elevations of approximately 80 cm above the runway, provides slightly less than 180 degree overall coverage of one side of the runway, each imaging assembly 362 providing 90 degree coverage which slightly overlaps with that provided by an adjacent imaging assembly 362. Here, it is seen that lower cameras 365 have fields of view which are located relatively close to the edge of the runway, while higher cameras 364 have fields of view which slightly overlap the fields of view of cameras 365 and extend beyond the center of the runway. It is appreciated that even though the illustrated embodiment shows cameras 364 and 365 stacked one on top of the other, that they may also be situated side by side, with different elevation angles.

In the illustrated example, each of detectors 1, 2, 3 and 4 comprise two pairs of two cameras, where the fields of view of the four cameras of detector 1 are designated as camera #1-1, camera #1-2, camera #1-3 and camera #1-4. Similar designations are used for the cameras of detectors 2, 3 and 4.

Turning to FIG. 7C, it is seen that each detector module of FIG. 6C, designated here by reference numeral 454 and having at least one scanning imaging assembly 411 (FIG. 6C) typically at an elevation of 50 cm above the runway, provides 180 degree overall coverage of one side of the runway.

Figure 8A:
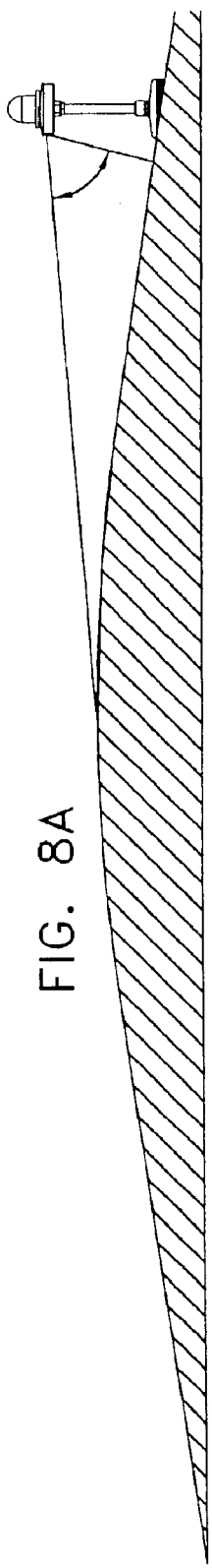
FIGS. 8A, 8B and 8C are simplified illustrations of the elevational extent of protected areas provided by an array of sensors of the types shown respectively in FIGS. 6A, 6B and 6C.
Figure 8B:
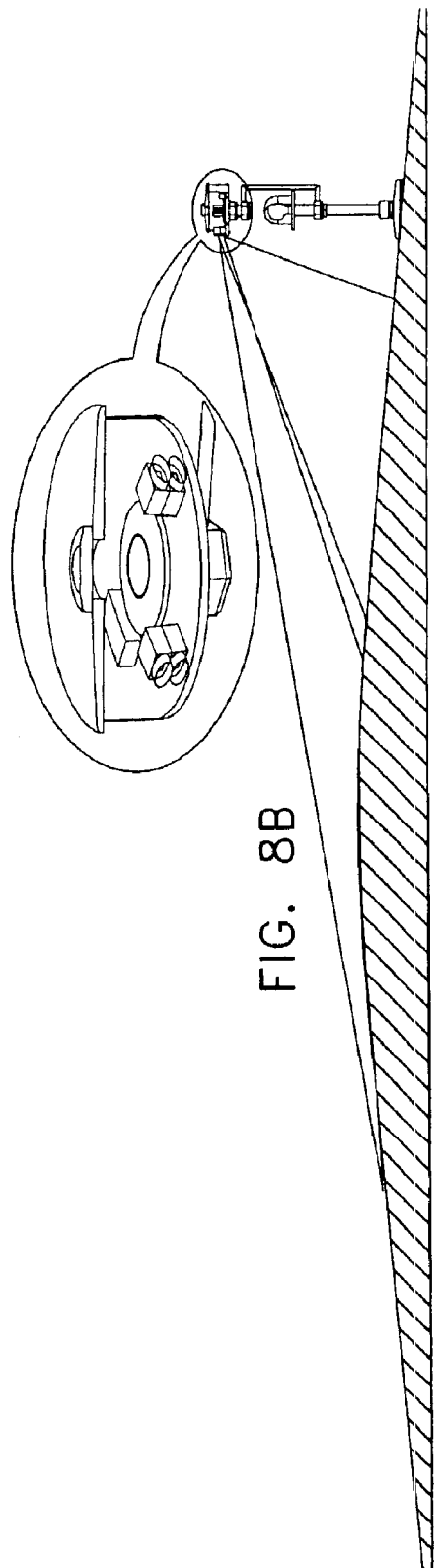
Figure 8C:
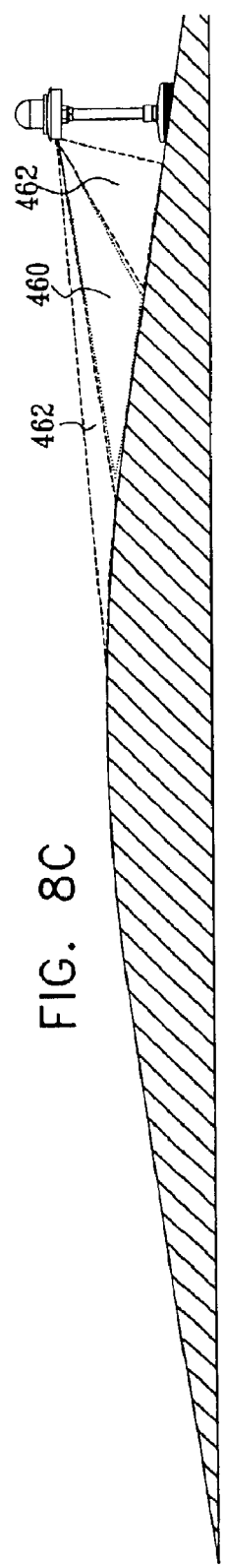

Reference is now made to FIGS. 8A, 8B and 8C, which are simplified illustrations of the elevational extent of protected areas provided by an array of sensors of the types shown respectively in FIGS. 6A, 6B and 6C. It is appreciated that FIGS. 8A–8C are not drawn to scale in order to emphasize the effect of the incline of the runway from its center to its sides, which is practice is about 2%.

FIG. 8A illustrates that in the illustrated example, the field of view of imaging assembly 311 (FIG. 6A) extends generally to the center of the runway. FIG. 8B illustrates that in the illustrated example, the field of view of imaging assembly 362 (FIG. 6B) partly extends beyond the center of the runway. FIG. 8B also shows that lower cameras 365 (FIG. 6B) have fields of view which are located relatively close to the edge of the runway, while higher cameras 364 (FIG. 6B) have fields of view which slightly overlap the fields of view of cameras 365 (FIG. 6B) and extend beyond the center of the runway. FIG. 8C illustrates that in the illustrated example, the field of view of imaging assembly 411 (FIG. 6C) extends generally to the center of the runway. FIG. 8C also shows the effect of a zoom in function providing a narrower, higher resolution, field of view 460 than the zoom out function, which scans fields of view 460 and 462.

Reference is now made to FIGS. 9A–9L, which, together, are a simplified flowchart illustrating the operation of a high speed detection output analyzer forming a portion of a system for detection of foreign objects on airport travel surfaces in accordance with a preferred embodiment of the present invention.

Figure 9A:
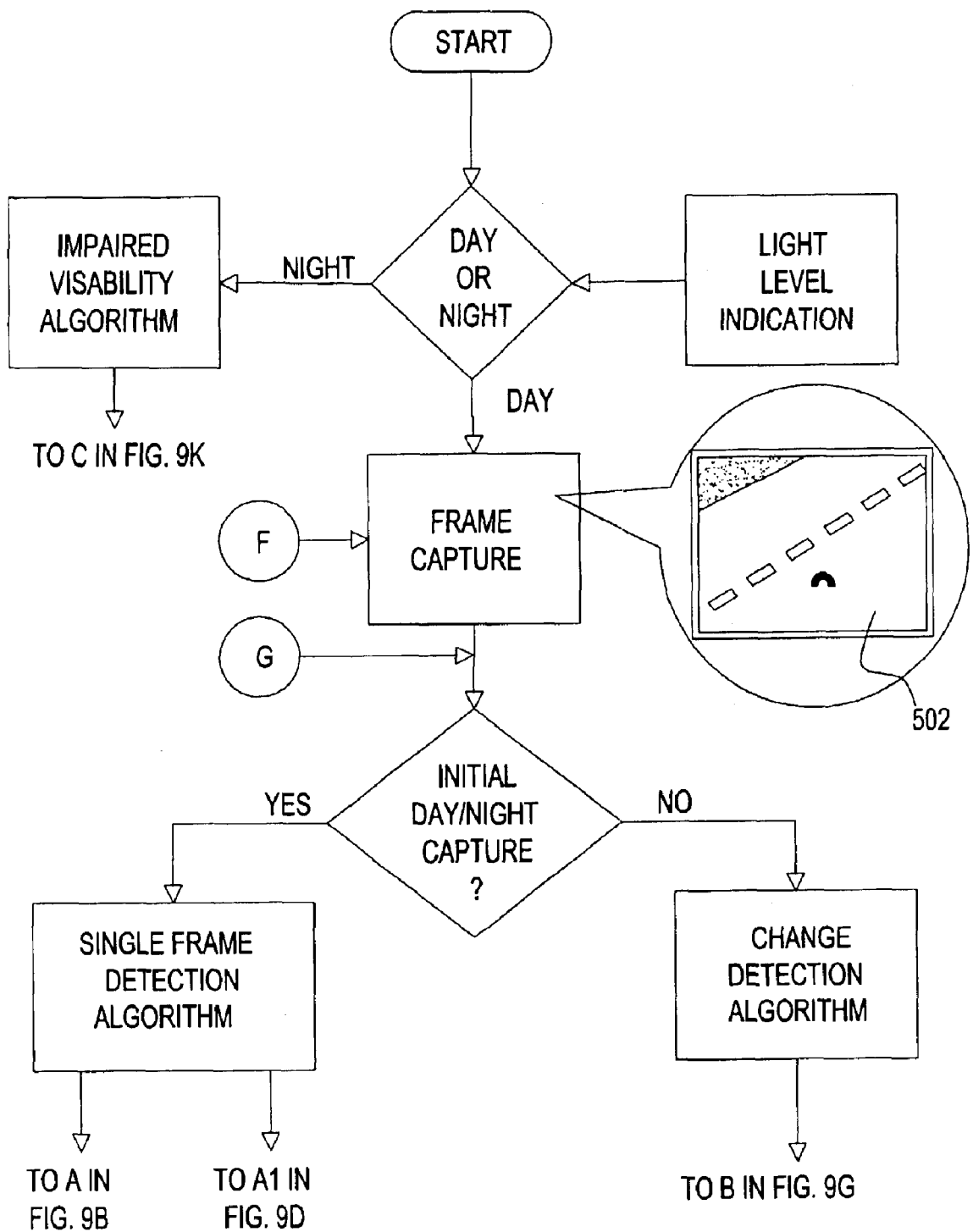

Turning to FIG. 9A, it is seen that operation of the high speed detection output analyzer forming a portion of the system for detection of foreign objects on airport travel surfaces in accordance with a preferred embodiment of the present invention may begin with receipt of a light level indication, such as from light level sensor 318 in the embodiment of FIG. 6A, light level sensor 368 in the embodiment of FIG. 6B or light level sensor 418 in the embodiment of FIG. 6C. Based on the light level, day (normal visibility) or night (impaired visibility) operation is indicated.

During daytime, assuming that weather conditions do not impair visibility, each detector module, such as detector modules 106 (FIGS. 1, 2A & 2B) and the detector modules described hereinabove in connection with FIGS. 6A–6C, captures at least one frame in its field of view. A typical frame, being part of a runway, is designated by reference numeral 502. If the frame capture is an initial day or night frame capture for a detector module, the analyzer processes frame 502 according to the single frame detection algorithm described hereinbelow in reference to FIGS. 9B–9F. If the frame capture is not an initial day or night frame capture for a detector module, the analyzer processes frame 502 according to the change detection algorithm described hereinbelow in reference to FIGS. 9G–9H.

Figure 9B:
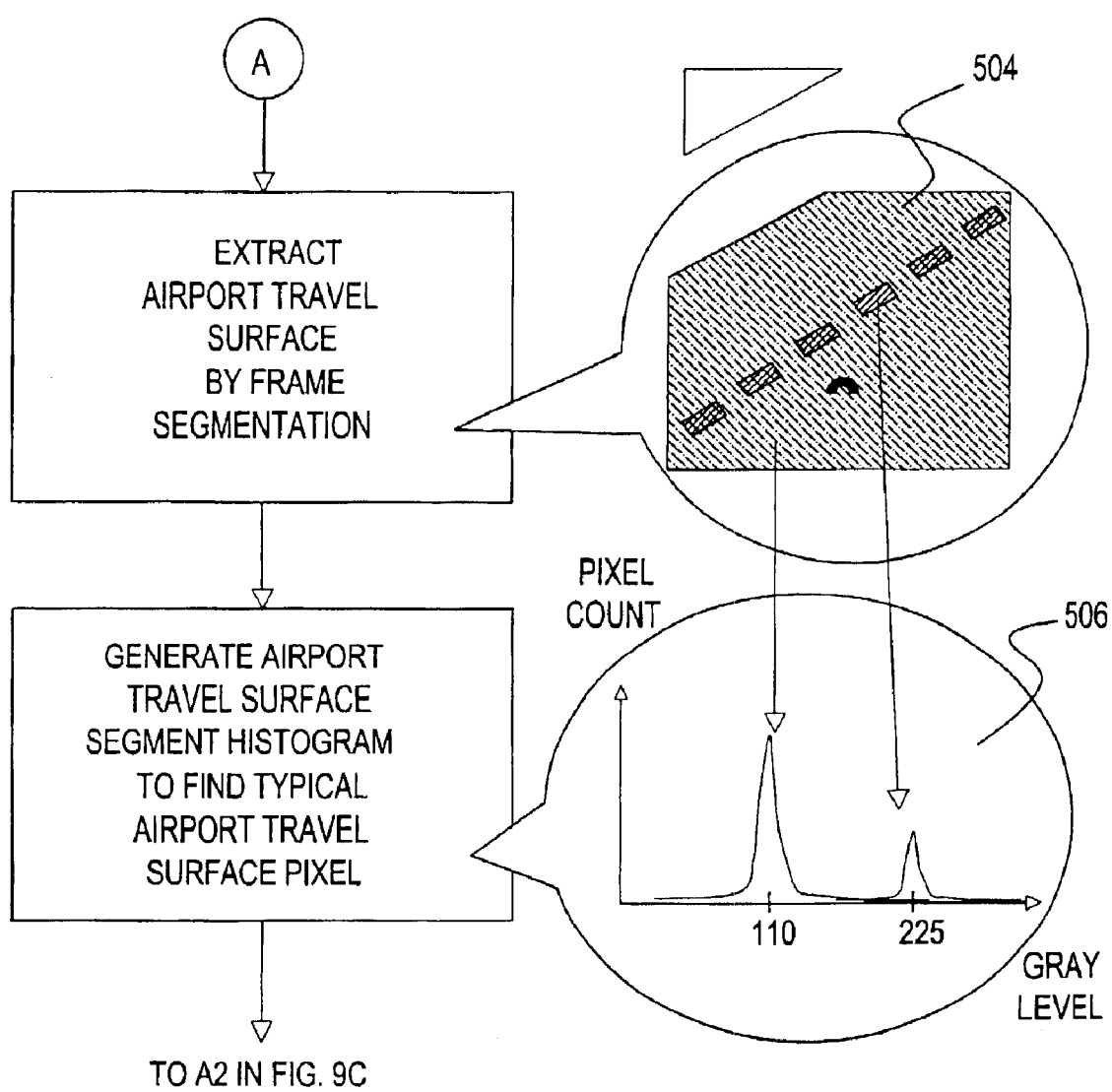

Turning to FIG. 9B, extraction of an airport travel surface, preferably by frame segmentation, takes place, yielding an image showing only the aircraft travel surface, here designated by reference numeral 504 in FIG. 9B.

A histogram or other suitable representation of the distribution of grey-level pixels on the aircraft travel surface is then preferably generated in order to determine a typical airport travel surface pixel grey level. An example of such a histogram is here designated by reference numeral 506.

Figure 9C:
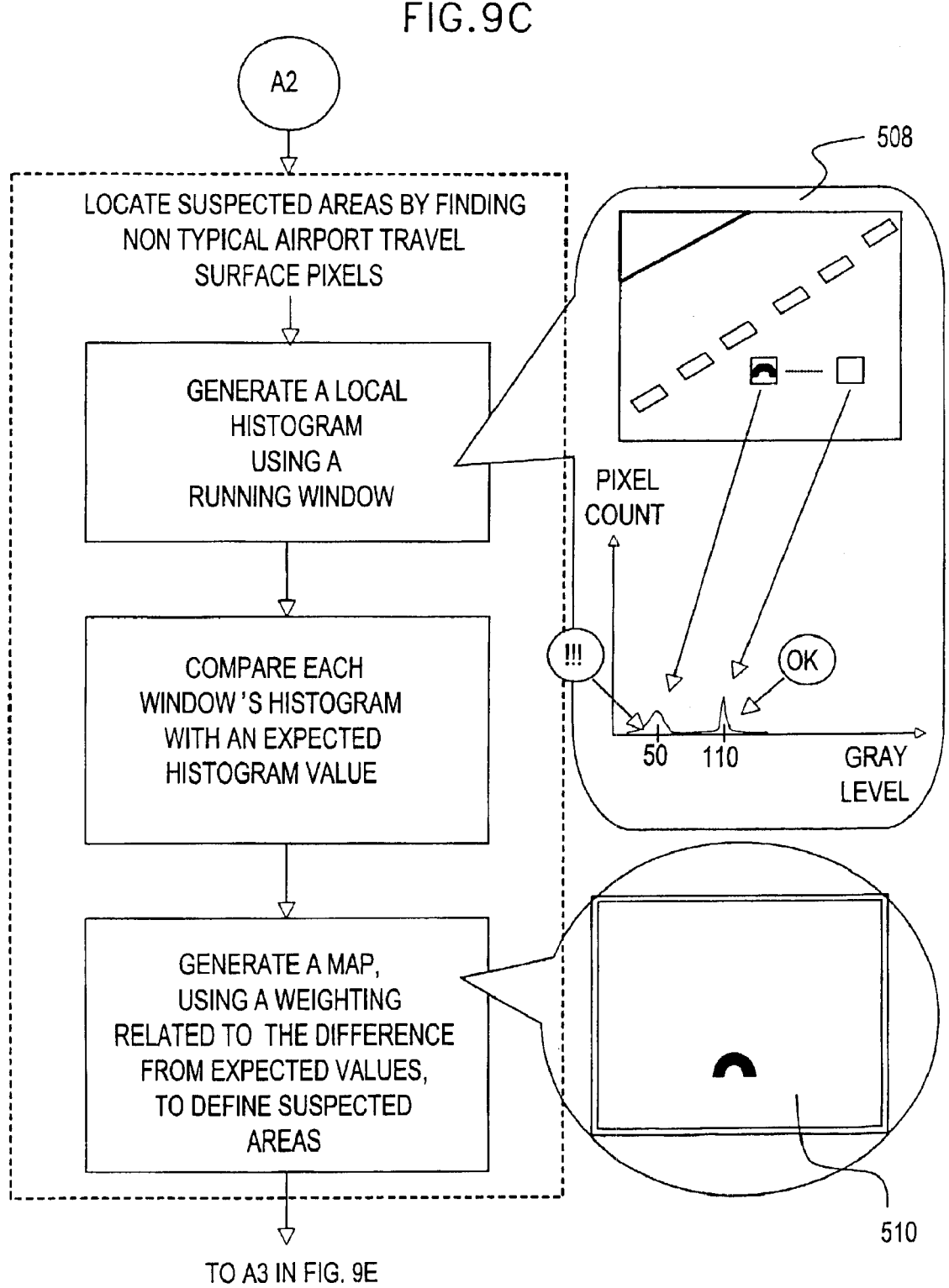

Suspect areas on the aircraft travel surface are then located by finding non-typical airport travel surface pixels. This is preferably accomplished, as shown in FIG. 9C, by generating local histograms by employing a running window as illustrated at reference numeral 508. Each local histogram is compared with an expected value and a map of suspect areas is generated based on differences between local histogram values and expected histogram values. An example of such a map is designated by reference numeral 510.

Figure 9D:
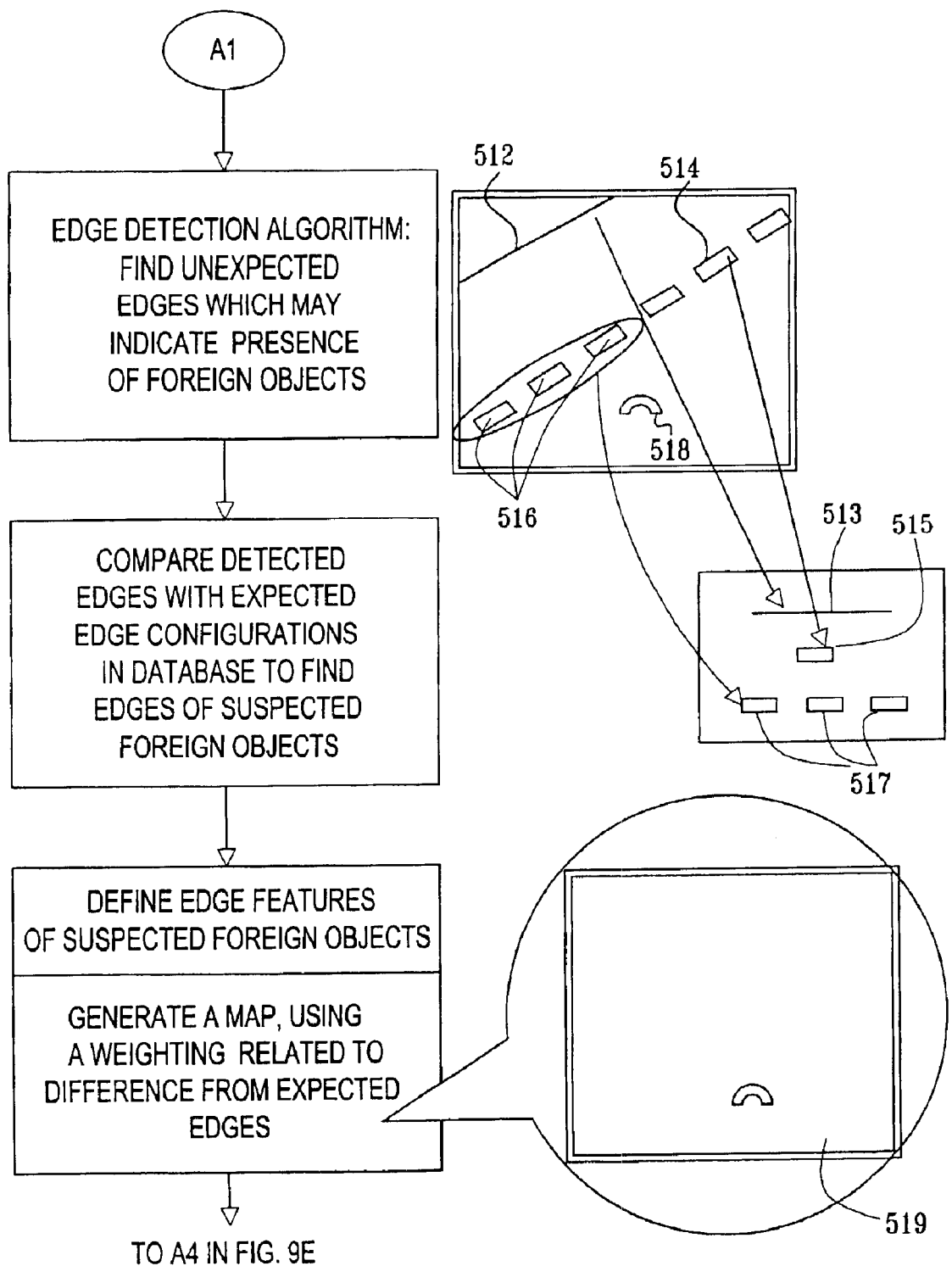

Preferably, while the steps illustrated in FIGS. 9B and 9C take place, a parallel analysis also occurs, as shown in FIG. 9D. Turning to FIG. 9D, it is seen that edge detection is carried out on frame 502 (FIG. 9A) in order to find unexpected edges which may indicate the presence of foreign objects. Examples of detected edges are indicated by reference numerals 512 and 514. The detected edges are compared with corresponding expected edge configurations, here designated by reference numerals 513 and 515, stored in a database which may or may not be local to the detector module. Additionally, the system analyzes detected edges for relationships between edges or edge enclosed areas, such as edge enclosed areas 516, which together match expected edge configuration 517. It is noted that the edge 518, which corresponds to a foreign object, does not have a matching configuration in the database.

A map, here designated by reference numeral 519, is generated to indicate the location of the non-matched, suspect detected edge and the extent to which the suspect detected edge differs from the matching configuration in the database.

Figure 9E:
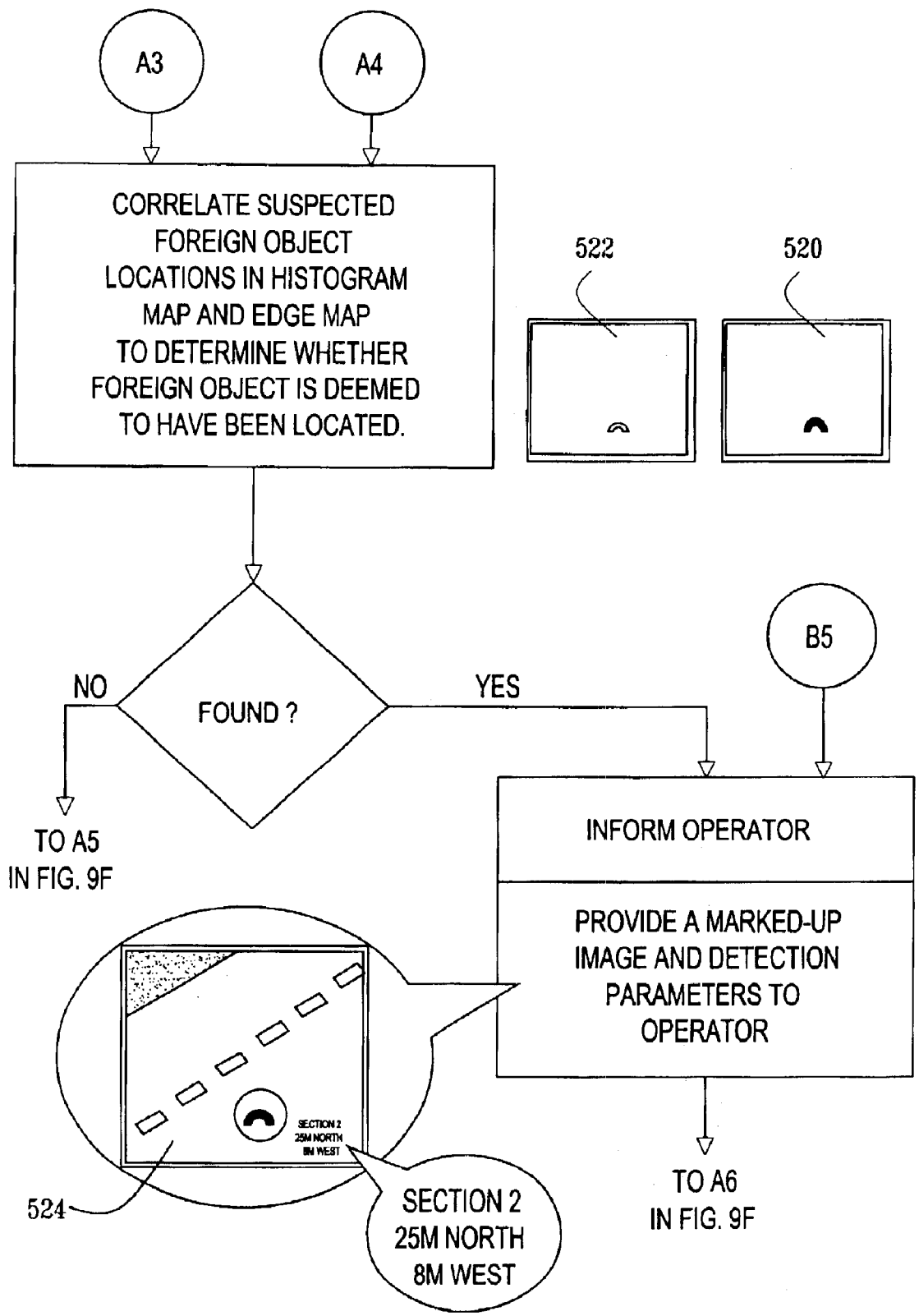

Turning to FIG. 9E, it is seen that the results of the parallel processes described above in FIGS. 9B–9C and 9D respectively are correlated in order to determine whether a foreign object is deemed to have been located. This is preferably carried out by comparing a histogram map here designated by reference numeral 520 with an edge map, here designated by reference numeral 522.

If a foreign object is deemed to have been located, a message is sent to a human operator through any suitable medium or media and a "marked up" version of frame 502 (FIG. 9A), here designated by reference numeral 524, emphasizing the location of the foreign object and providing location information, is displayed for the operator.

Figure 9F:
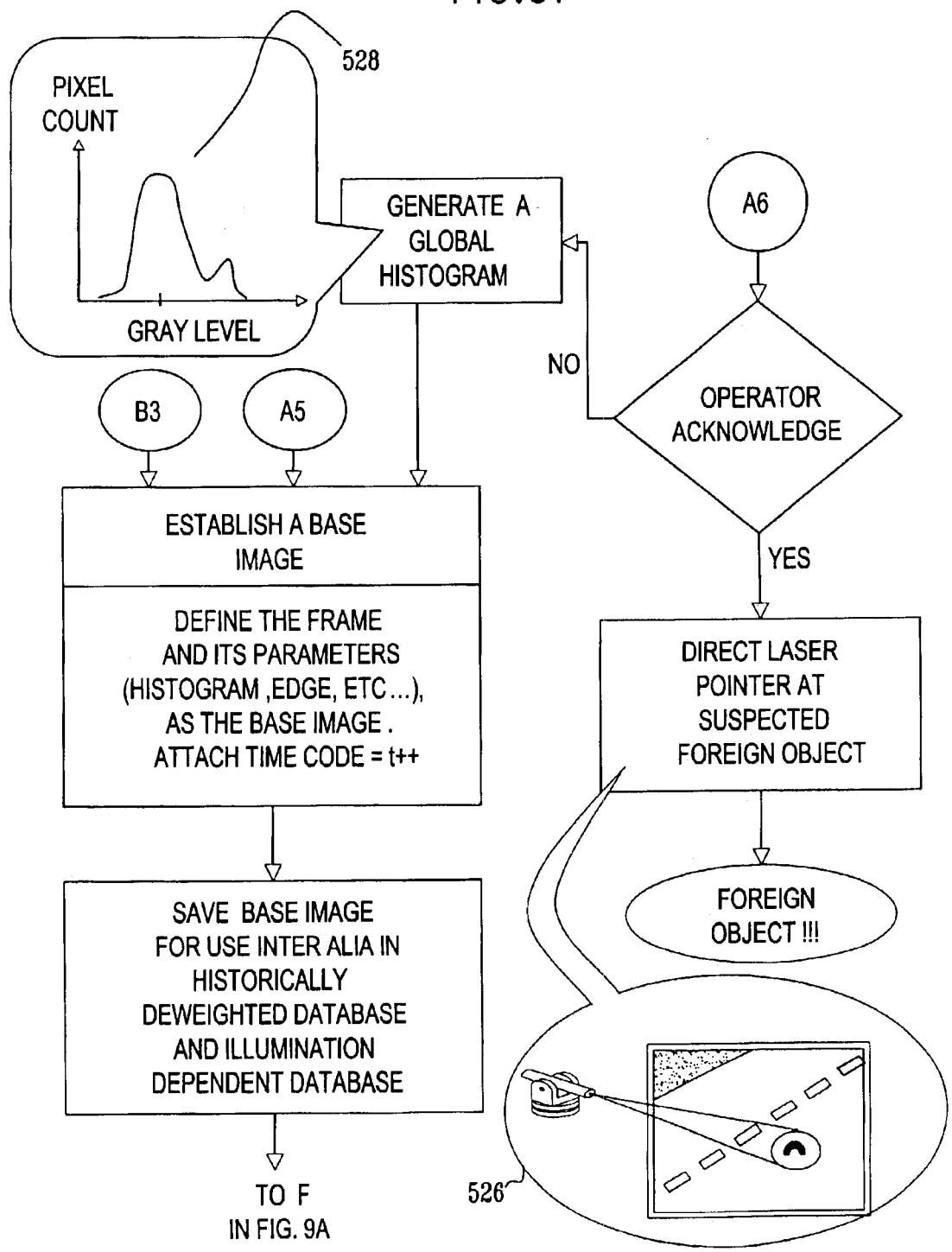

As indicated in FIG. 9F, upon receipt of an acknowledgment from the human operator of his receipt of the message, a foreign object designator, such as a laser pointer 110 (FIG. 1) may be directed at the foreign object, as illustrated at reference numeral 526.

If a foreign object is not found by correlation or should the operator determine that a foreign object is not present, the frame 502 (FIG. 9A) and the data generated relative thereto as described hereinabove, together with a global histogram of frame 502 (FIG. 9A), here indicated by reference numeral 528, are stored in a database, which may or may not be local to a given detector module. The stored information may be used as a base image for later comparison. It may be used together with multiple stored based images, which are preferably historically deweighted.

Figure 9G:
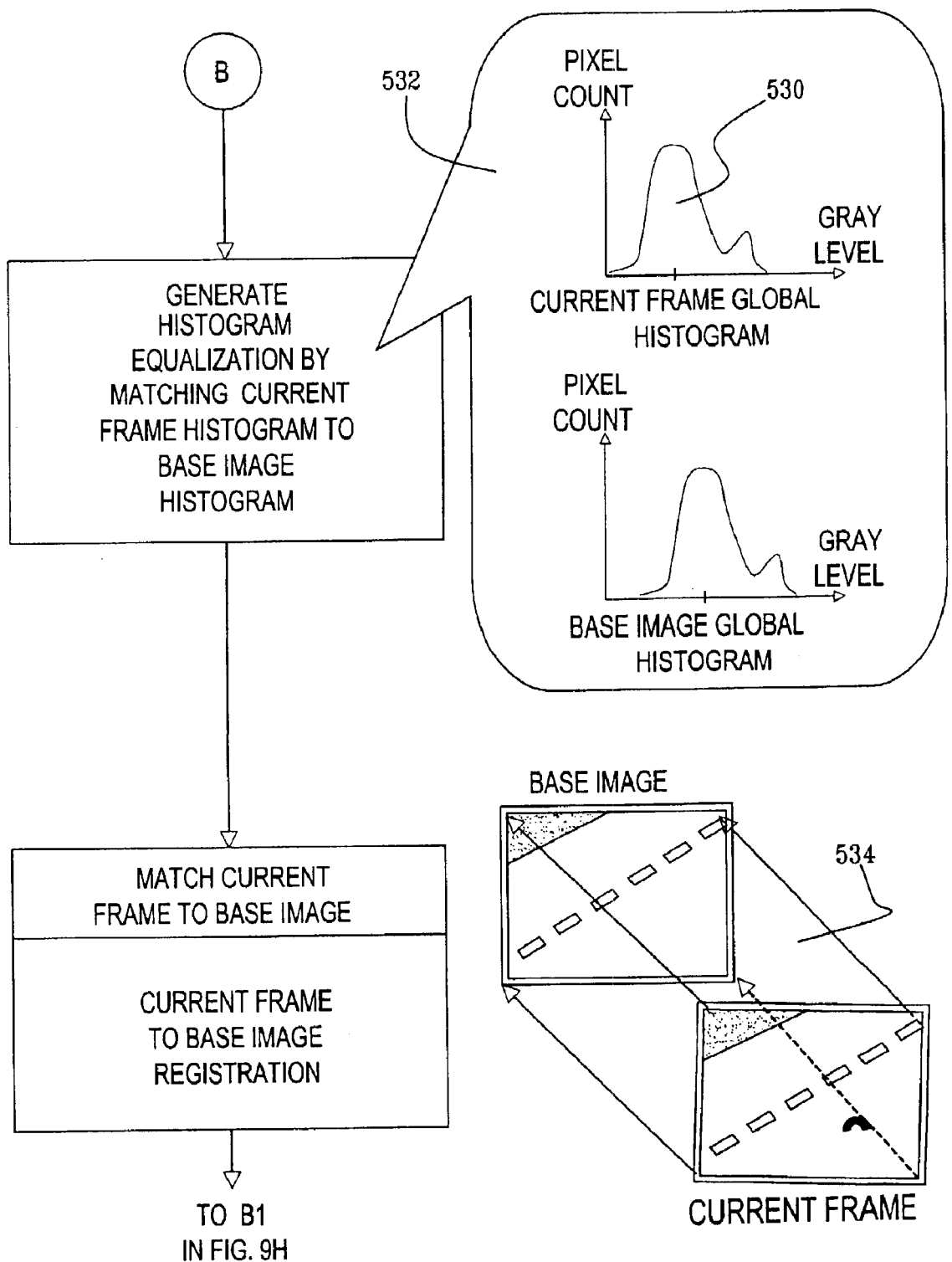
Figure 9H:
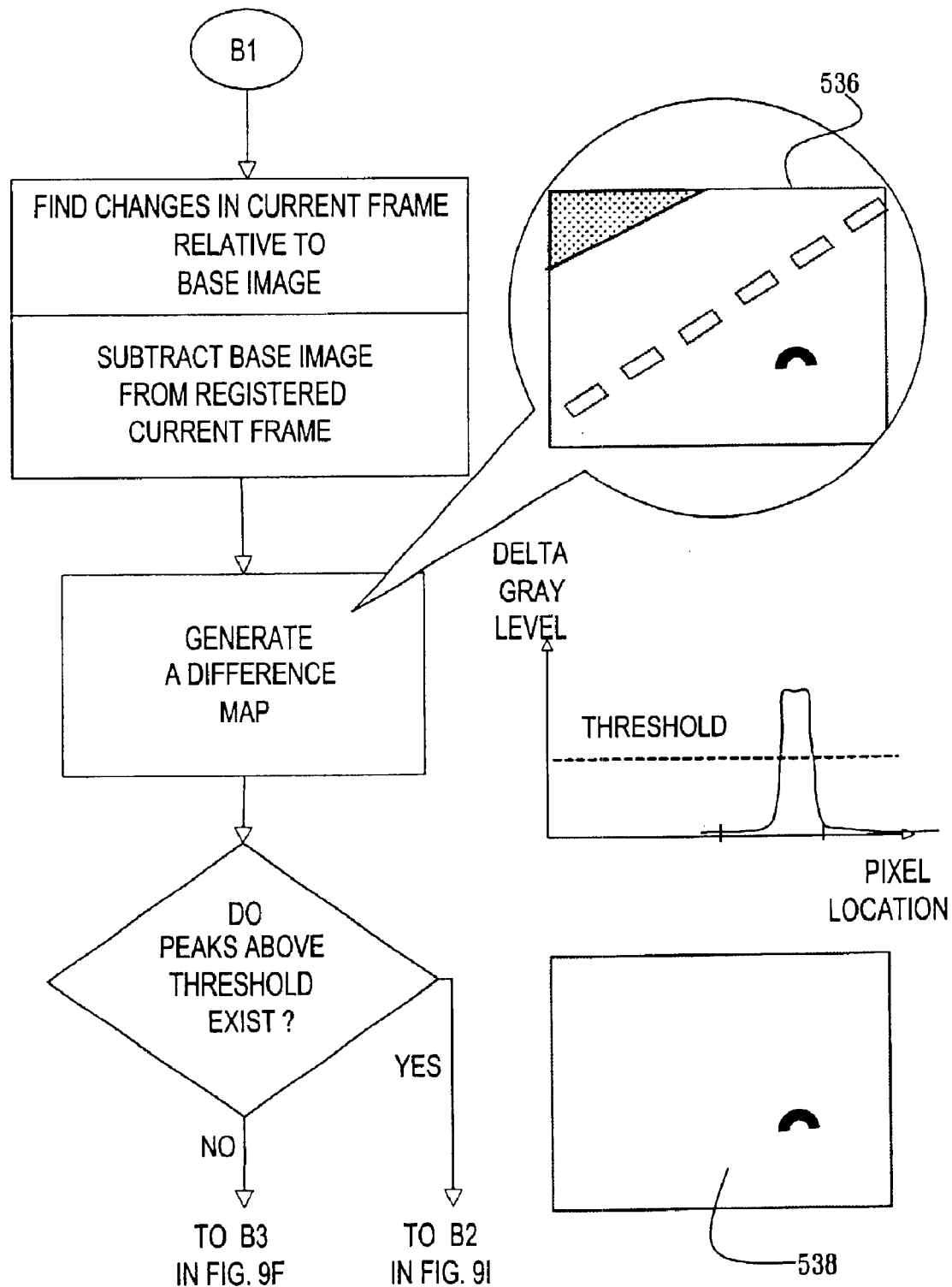

Turning to FIGS. 9G and 9H, if the frame capture is not an initial frame capture for a detector module, a global histogram is generated for the current frame, as designated by reference numeral 530 and this global histogram is compared with one or more stored global histograms of preceding frames, preferably employing histogram equalizations, as illustrated at reference numeral 532.

In addition, the current frame and the base frame images are brought into registration and compared, as illustrated at reference numeral 534, to indicate changes therebetween and a difference map, designated by reference numeral 536, is produced. The difference map is thresholded, to render a thresholded difference map, as indicated by reference numeral 538. If peaks remain in the thresholded difference map a multi-sensor analysis is conducted, as indicated in FIG. 9I.

In the illustrated embodiment, the multi-sensor analysis is carried out in two stages, initially employing outputs of sensors, such as cameras, on a single detector module and thereafter on outputs of sensors, such as cameras, on multiple detector modules. Alternatively, any other suitable multi-sensor analysis regime may be employed.

Figure 9J:
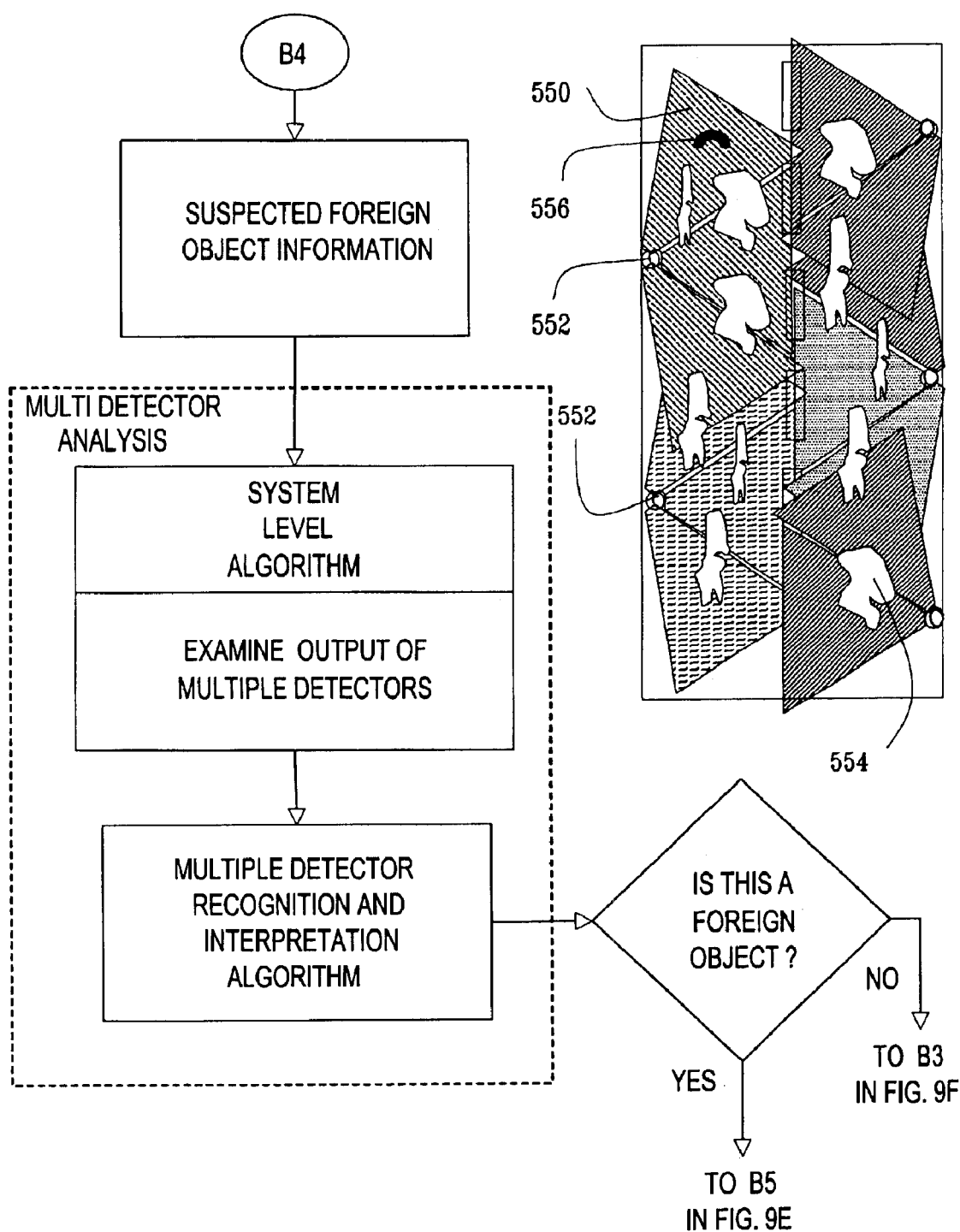

As seen in FIGS. 9I and 9J, suspected foreign object information is received from multiple sensors, such as cameras 314, in detector module 309, in the embodiment of FIG. 6A. This information preferably includes size, shape and associated gray levels of the suspected foreign object detected, and location information within the field of view of the sensor. Additionally, the global histogram map 530 of FIG. 9G and the difference map 536 of FIG. 9H may also be included in the information received. This information from multiple sensors is considered together and compared with stored information which helps to distinguish detected patterns extending over the fields of view 540 of multiple sensors, such as skid marks 542, which do not constitute foreign objects, from an actual foreign object 544.

If a foreign object is still believed to be present, suspected foreign object information is received from multiple sensors, such as cameras, in multiple detector modules. This information preferably includes size, shape and associated gray levels of the suspected foreign object detected, and location information within the field of view of the detector. Additionally, the global histogram map 530 of FIG. 9G and the difference map 536 of FIG. 9H may also be included in the information received. This information from multiple detectors is considered together and compared with stored information which helps to distinguish detected patterns extending over the fields of view 550 of multiple sensors, such as cameras, on multiple detector modules 552, such as slush 554 or a moving vehicle, which do not constitute foreign objects, from an actual foreign object 556.

Figure 9K:
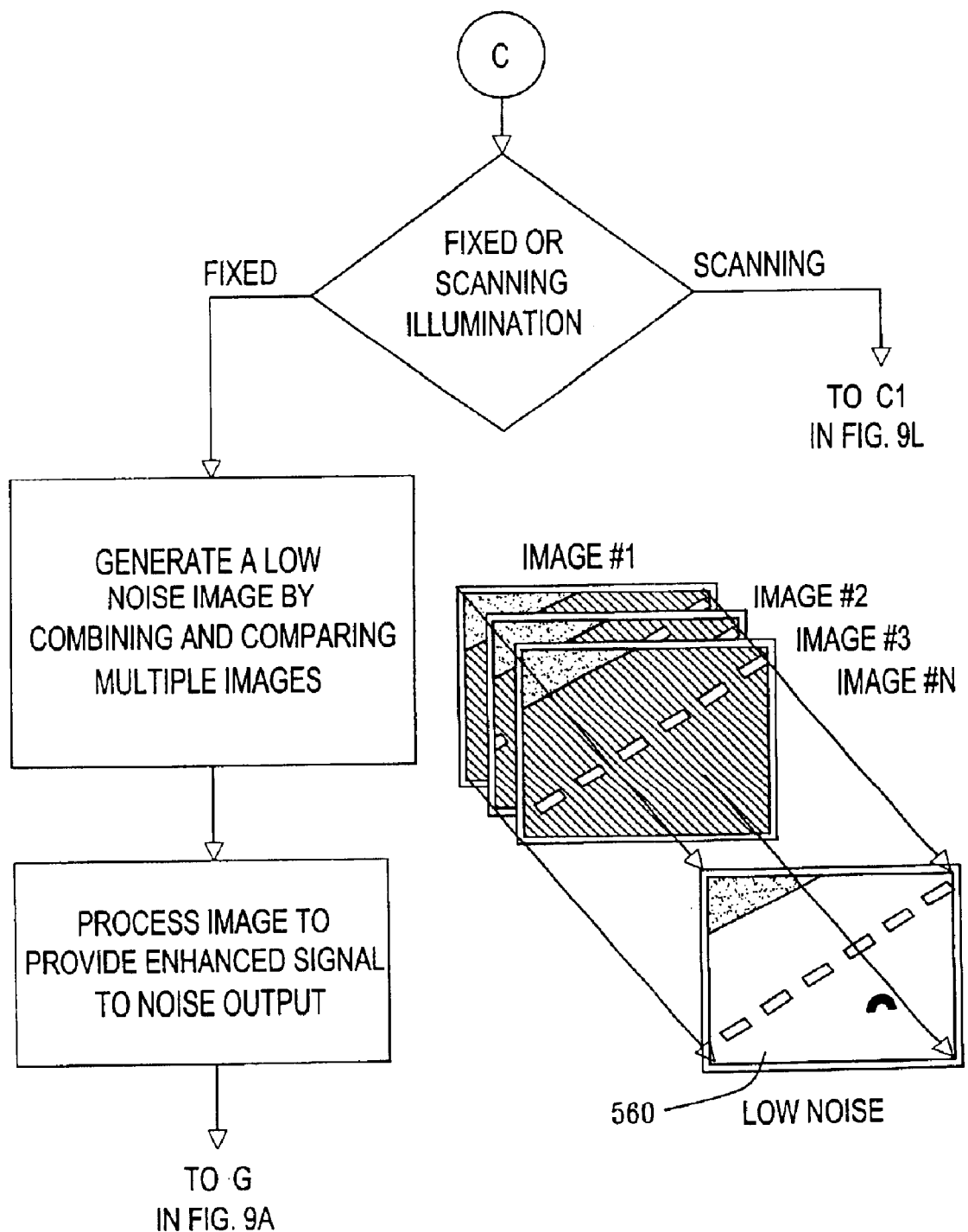

Reference is now made to FIG. 9K, which illustrates operation in an impaired visibility environment. If fixed illumination is employed, multiple images are captured at multiple times and combined, for example by averaging, to provide a combined noise reduced frame 560 for analysis.

Figure 9L:
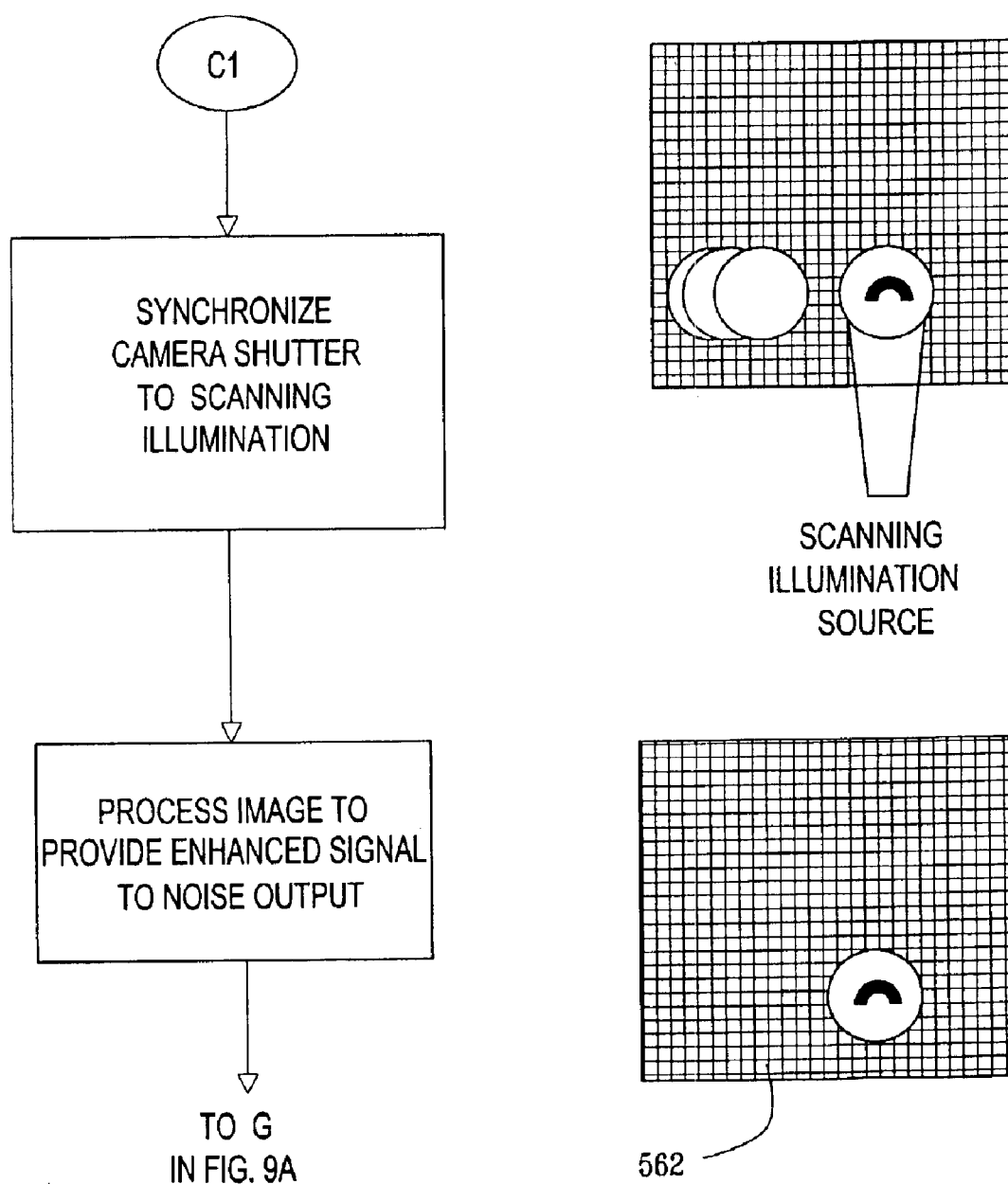

As seen in FIG. 9L, if scanning illumination is employed, the operation of the scanner and of the camera is synchronized to provide a suitable frame 562 for analysis.

The frames 560 or 562 may then be processed for further signal to noise enhancement and are then processed as described hereinabove for frames, such as frame 502, captured during the day. It is appreciated that frames captured under impaired visibility conditions may be analyzed entirely or partially separately from frames captured under full visibility conditions.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A system for detection of foreign objects on airport travel surfaces comprising:
   a plurality of foreign object detector modules mounted on a corresponding plurality of existing aircraft travel surface lighting supports, said plurality of foreign object detector modules providing a corresponding plurality of detection outputs; and
   a high speed detection output analyzer operative to receive at least one of said plurality of detection outputs and to provide a high speed output indication of foreign object presence.

2. A system for detection of foreign objects on airport travel surfaces according to claim 1 wherein said airport travel surfaces include at least one taxiway and at least one runway and said system employs at least some existing electrical power infrastructure associated with existing runway and taxiway lighting fixtures.

3. A system for detection of foreign objects on airport travel surfaces according to claim 1 and wherein said plurality of foreign object detector modules communicate with a computer system comprising an operator console operative to provide a foreign object presence alarm and an image of the foreign object to an operator.

4. A system for detection of foreign objects on airport travel surfaces according to claim 3 and wherein said high speed detection output analyzer is located in the vicinity of said operator console.

5. A system for detection of foreign objects on airport travel surfaces according to claim 1 and wherein at least one of said plurality of foreign object detector modules incorporates at least one foreign object sensor module which provides said detection output to said high speed detection output analyzer which is remotely located with respect thereto.

6. A system for detection of foreign objects according to claim 5 and wherein said high speed detection output analyzer comprises multiple sensor correlation software providing an output based on the correlation between said detection output from multiple ones of said at least one foreign object sensor module in individual ones of said plurality of detector modules.

7. A system for detection of foreign objects according to claim 5 and wherein said high speed detection output analyzer comprises multiple detector correlation software providing an output based on the correlation between said detection output from multiple ones of said at least one foreign object sensor module in multiple ones of said plurality of detector modules.

8. A system for detection of foreign objects on airport travel surfaces according to claim 1 wherein each of said plurality of foreign object detector modules comprises a foreign object sensor module comprising at least one camera and at least one illuminator.

9. A system for detection of foreign objects on airport travel surfaces according to claim 8 and wherein said at least one illuminator comprises a fixed field illuminator.

10. A system for detection of foreign objects on airport travel surfaces according to claim 8 and wherein said at least one illuminator comprises a scanning illuminator.

11. A system for detection of foreign objects on airport travel surfaces according to claim 8 and wherein said at least one camera comprises a fixed field camera.

12. A system for detection of foreign objects on airport travel surfaces according to claim 8 and wherein said at least one camera comprises a scanning camera.

13. A system for detection of foreign objects on airport travel surfaces according to claim 8 and wherein said at least one camera includes a zoom functionality.

14. A system for detection of foreign objects on airport travel surfaces according to claim 1 wherein each of said plurality of foreign object detector modules also has associated therewith at least one of a light level sensor, a vibration sensor and a temperature sensor.

15. A system for detection of foreign objects on airport travel surfaces according to claim 1 and wherein said high speed detection output analyzer is operative to provide said high speed output indication of foreign object presence within less than 1 minute.

16. A system for detection of foreign objects on airport travel surfaces comprising:
   a plurality of foreign object detector modules mounted on a corresponding plurality of existing aircraft travel surface lighting supports located along aircraft travel surfaces and providing a corresponding plurality of detection outputs; and
   a high speed detection output analyzer operative to receive said plurality of detection outputs and to provide a high speed output indication of foreign object presence within less than 1 minute.

17. A system for detection of foreign objects on airport travel surfaces according to claim 16 wherein said airport travel surfaces include at least one taxiway and at least one runway and said system employs at least some existing electrical power infrastructure associated with existing runway and taxiway lighting fixtures.

18. A system for detection of foreign objects on airport travel surfaces according to claim 16 and wherein said plurality of foreign object detector modules communicate with a computer system comprising an operator console operative to provide a foreign object presence alarm and an image of the foreign object to an operator.

19. A system for detection of foreign objects on airport travel surfaces according to claim 18 and wherein said high speed detection output analyzer is located in the vicinity of said operator console.

20. A system for detection of foreign objects on airport travel surfaces according to claim 16 and wherein at least one of said plurality of foreign object detector modules incorporates at least one foreign object sensor module which provides said detection output to said high speed detection output analyzer which is remotely located with respect thereto.

21. A system for detection of foreign objects according to claim 20 and wherein said high speed detection output analyzer comprises multiple sensor correlation software providing an output based on the correlation between said detection output from multiple ones of said at least one foreign object sensor module in individual ones of said plurality of detector modules.

22. A system for detection of foreign objects according to claim 20 and wherein said high speed detection output analyzer comprises multiple detector correlation software providing an output based on the correlation between said detection output from multiple ones of said at least one foreign object sensor module in multiple ones of said plurality of detector modules.

23. A system for detection of foreign objects on airport travel surfaces according to claim 16 wherein each of said plurality of foreign object detector modules comprises a foreign object sensor module comprising at least one camera and at least one illuminator.

24. A system for detection of foreign objects on airport travel surfaces according to claim 23 and wherein said at least one illuminator comprises a fixed field illuminator.

25. A system for detection of foreign objects on airport travel surfaces according to claim 23 and wherein said at least one illuminator comprises a scanning illuminator.

26. A system for detection of foreign objects on airport travel surfaces according to claim 23 and wherein said at least one camera comprises a fixed field camera.

27. A system for detection of foreign objects on airport travel surfaces according to claim 23 and wherein said at least one camera comprises a scanning camera.

28. A system for detection of foreign objects on airport travel surfaces according to claim 23 and wherein said at least one camera includes a zoom functionality.

29. A system for detection of foreign objects on airport travel surfaces according to claim 23 wherein each of said plurality of foreign object detector modules also has associated therewith at least one of a light level sensor, a vibration sensor and a temperature sensor.

30. A method for detection of foreign objects on airport travel surfaces comprising:
mounting a plurality of foreign object detector modules on a corresponding plurality of existing aircraft travel surface lighting supports;
operating said plurality of foreign object detector modules providing a corresponding plurality of detection outputs; and
analyzing said detection outputs at high speed to provide a high speed output indication of foreign object presence.

31. A method for detection of foreign objects on airport travel surfaces according to claim 30 wherein said airport travel surfaces include at least one taxiway and at least one runway, and the method comprises employing at least some existing electrical power infrastructure associated with existing runway and taxiway lighting fixtures.

32. A method for detection of foreign objects on airport travel surfaces according to claim 30 and also comprising:
communicating with an operator console; and
providing a foreign object presence alarm and an image of the foreign object to an operator.

33. A method for detection of foreign objects on airport travel surfaces according to claim 32 and wherein analyzing said detection outputs takes place in the vicinity of said operator console.

34. A method for detection of foreign objects on airport travel surfaces according to claim 30 and wherein at least one of said plurality of foreign object detector modules incorporates at least one foreign object sensor module which views a portion of an aircraft travel surface and provides said detection output to said high speed detection output analyzer which is remotely located with respect thereto.

35. A method for detection of foreign objects according to claim 34 and also comprising providing an output based on the correlation between said detection output from multiple ones of said at least one foreign object sensor module in individual ones of said plurality of detector modules.

36. A method for detection of foreign objects according to claim 34 and also comprising providing an output based on the correlation between said detection output from multiple ones of said at least one foreign object sensor module in multiple ones of said plurality of detector modules.

37. A method for detection of foreign objects on airport travel surfaces according to claim 30 wherein said operating said plurality of foreign object detector modules comprises capturing an image of a portion of said aircraft travel surface, with at least one camera.

38. A method for detection of foreign objects on airport travel surfaces according to claim 37 and also comprising illuminating a portion of an aircraft travel surface, with at least one illuminator.

39. A method for detection of foreign objects on airport travel surfaces according to claim 38 and wherein said illuminating comprises illuminating using a fixed field illuminator.

40. A method for detection of foreign objects on airport travel surfaces according to claim 38 and wherein said illuminating comprises illuminating using a scanning illuminator.

41. A method for detection of foreign objects on airport travel surfaces according to claim 37 and wherein said capturing an image comprises capturing an image with a fixed field camera.

42. A method for detection of foreign objects on airport travel surfaces according to claim 37 and wherein said capturing an image comprises capturing an image with a scanning camera.

43. A method for detection of foreign objects on airport travel surfaces according to claim 37 and wherein said capturing an image comprises capturing an image using a camera with a zoom functionality.

44. A method for detection of foreign objects on airport travel surfaces according to claim 37 wherein each of said plurality of foreign object detector modules also has associated therewith at least one of a light level sensor, a vibration sensor and a temperature sensor which provide inputs useful in said analyzing step.

45. A method for detection of foreign objects on airport travel surfaces comprising:
mounting a plurality of foreign object detector modules on a corresponding plurality of existing aircraft travel surface lighting supports along airport travel surfaces;
operating said plurality of foreign object detector modules providing a corresponding plurality of detection outputs; and
analyzing said detection outputs at high speed to provide a high speed output indication of foreign object presence within less than 1 minute.

46. A method for detection of foreign objects on airport travel surfaces according to claim 45 wherein said airport travel surfaces include at least one taxiway and at least one runway and the method comprises employing at least some existing electrical power infrastructure associated with existing runway and taxiway lighting fixtures.

47. A method for detection of foreign objects on airport travel surfaces according to claim 45 and also comprising:

communicating with an operator console; and providing a foreign object presence alarm and an image of the foreign object to an operator.

48. A method for detection of foreign objects on airport travel surfaces according to claim 47 and wherein analyzing said detection outputs takes place in the vicinity of said operator console.

49. A method for detection of foreign objects on airport travel surfaces according to claim 45 and wherein at least one of said plurality of foreign object detector modules incorporates at least one foreign object sensor module which views a portion of an aircraft travel surface and provides said detection output to said high speed detection output analyzer which is remotely located with respect thereto.

50. A method for detection of foreign objects according to claim 49 and also comprising providing an output based on the correlation between said detection output from multiple ones of said at least one foreign object sensor module in individual ones of said plurality of detector modules.

51. A method for detection of foreign objects according to claim 49 and also comprising providing an output based on the correlation between said detection output from multiple ones of said at least one foreign object sensor module in multiple ones of said plurality of detector modules.

52. A method for detection of foreign objects on airport travel surfaces according to claim 45 wherein said operating said plurality of foreign object detector modules comprises capturing an image of a portion of said aircraft travel surface, with at least one camera.

53. A method for detection of foreign objects on airport travel surfaces according to claim 52 and also comprising illuminating a portion of an aircraft travel surface, with at least one illuminator.

54. A method for detection of foreign objects on airport travel surfaces according to claim 53 and wherein said illuminating comprises illuminating using a fixed field illuminator.

55. A method for detection of foreign objects on airport travel surfaces according to claim 53 and wherein said illuminating comprises illuminating using a scanning illuminator.

56. A method for detection of foreign objects on airport travel surfaces according to claim 52 and wherein said capturing an image comprises capturing an image with a fixed field camera.

57. A method for detection of foreign objects on airport travel surfaces according to claim 52 and wherein said capturing an image comprises capturing an image with a scanning camera.

58. A method for detection of foreign objects on airport travel surfaces according to claim 52 and wherein said capturing an image comprises capturing an image using a camera with a zoom functionality.

59. A method for detection of foreign objects on airport travel surfaces according to claim 52 wherein each of said plurality of foreign object detector modules also has associated therewith at least one of a light level sensor, a vibration sensor and a temperature sensor which provide inputs useful in said analyzing step.

* * * * *

UNITED STATES PATENT AND TRADEMARK OFFICE
CERTIFICATE OF CORRECTION

PATENT NO. : 6,917,309 B2
APPLICATION NO. : 10/281772
DATED : July 12, 2005
INVENTOR(S) : Alon Nitzan et al.

It is certified that error appears in the above-identified patent and that said Letters Patent is hereby corrected as shown below:

On title page, item (73), "Integritech System Engineering Ltd." should be --Xsight Systems Ltd.--

Signed and Sealed this

Nineteenth Day of August, 2008

JON W. DUDAS
*Director of the United States Patent and Trademark Office*